(12) United States Patent
Masamura et al.

(10) Patent No.: US 8,025,268 B2
(45) Date of Patent: Sep. 27, 2011

(54) MANUAL VALVE

(75) Inventors: Akinori Masamura, Komaki (JP);
Tetsuya Ishihara, Nagoya (JP)

(73) Assignee: CKD Corporation, Komaki (JP)

( * ) Notice: Subject to any disclaimer, the term of this patent is extended or adjusted under 35 U.S.C. 154(b) by 747 days.

(21) Appl. No.: 12/216,765

(22) Filed: Jul. 10, 2008

(65) Prior Publication Data

US 2009/0020723 A1 Jan. 22, 2009

(30) Foreign Application Priority Data

Jul. 20, 2007 (JP) ................................. 2007-189912
Nov. 29, 2007 (JP) ................................. 2007-308804
Apr. 22, 2008 (JP) ................................. 2008-111146

(51) Int. Cl.
*F16K 31/50* (2006.01)

(52) U.S. Cl. ........... 251/81; 251/267; 251/297; 251/331
(58) Field of Classification Search ................... 251/331,
251/335.2, 297, 79–81, 266–269, 215
See application file for complete search history.

(56) References Cited

U.S. PATENT DOCUMENTS

| | | | | | |
|---|---|---|---|---|---|
| 2,214,000 | A | * | 9/1940 | Sifkovitz | 251/81 |
| 2,608,377 | A | * | 8/1952 | Streun | 251/81 |
| 3,053,498 | A | * | 9/1962 | Dumm | 251/81 |
| 3,441,115 | A | * | 4/1969 | Gunther | 464/36 |
| 3,778,027 | A | * | 12/1973 | Collins et al. | 251/297 |
| 3,827,670 | A | * | 8/1974 | Saarem | 251/81 |
| 3,901,474 | A | * | 8/1975 | Kubota | 251/159 |
| 4,338,961 | A | * | 7/1982 | Karpenko | 137/243.2 |
| 4,619,437 | A | * | 10/1986 | Williams et al. | 251/81 |
| 2006/0006357 | A1 | * | 1/2006 | Meyers | 251/331 |
| 2008/0157015 | A1 | * | 7/2008 | Daido et al. | 251/80 |

FOREIGN PATENT DOCUMENTS

| | | |
|---|---|---|
| JP | A-2004-324661 | 11/2004 |
| JP | A-2005-344918 | 12/2005 |

* cited by examiner

*Primary Examiner* — John Bastianelli
(74) *Attorney, Agent, or Firm* — Oliff & Berridge, PLC

(57) ABSTRACT

A manual valve comprises a valve element, a rod connected to the valve element, and a knob for moving the rod by screw feeding in an opening/closing direction with respect to the valve element. The valve element is moved by rotation of the knob through the rod. The rod includes an external thread portion on an outer periphery thereof and is not connected to the knob and is held against rotation. Further, the manual valve includes a cylindrical sliding nut rotatably held by a body and formed with an internal thread portion to be engaged with the external thread portion of the rod on its inner periphery and a clip fixed to the knob to be elastically deformably engaged with the sliding nut but disengaged when a larger torque than the predetermined value is applied.

19 Claims, 15 Drawing Sheets

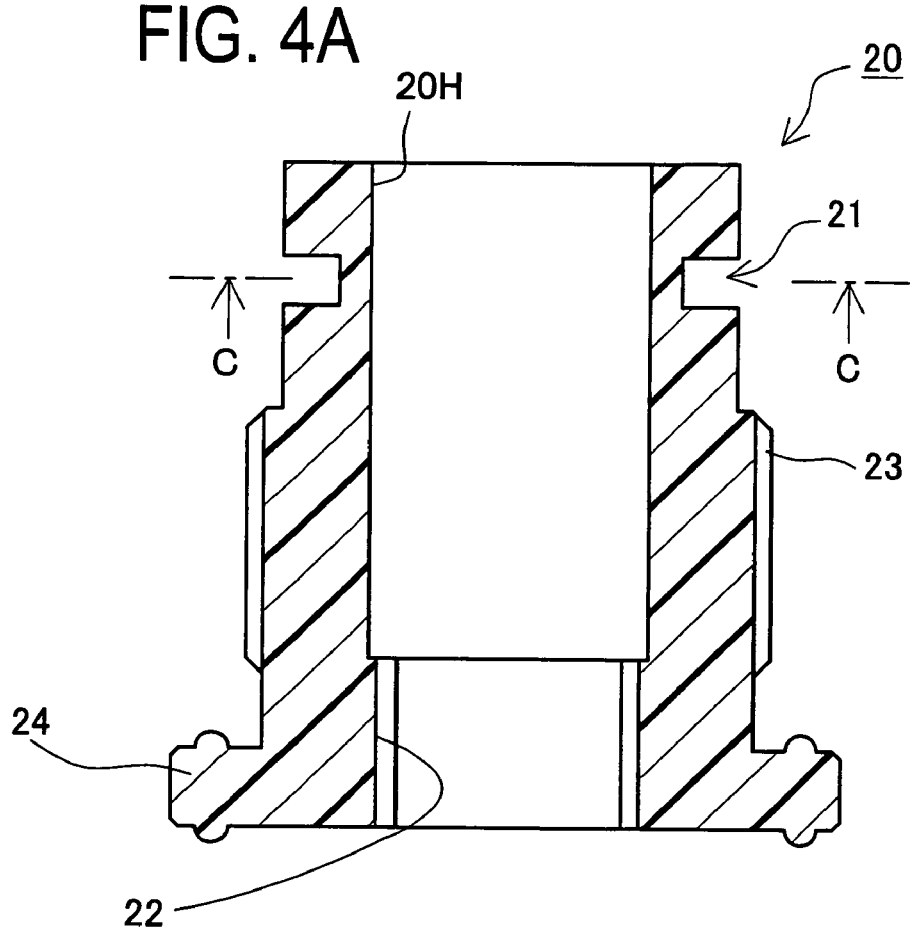
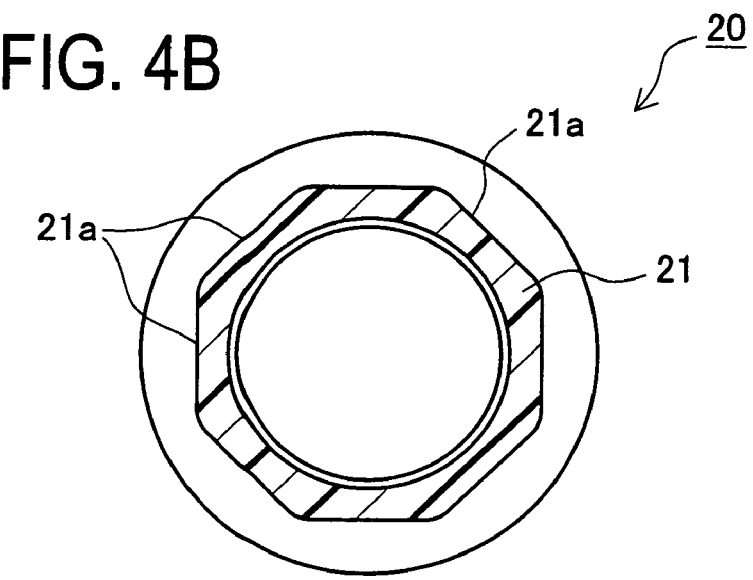

MANUAL VALVE

BACKGROUND OF THE INVENTION

1. Field of the Invention

The present invention relates to a manual valve for controlling fluid by rotating a knob manually and particularly to a manual valve for controlling chemical liquid or the like to be used in a semiconductor manufacturing device.

2. Description of Related Art

Heretofore, a manual valve has been employed in a semiconductor manufacturing device, for example, as a chemical liquid valve for controlling flow of a chemical liquid to be supplied to a chemical liquid supply unit or as a chemical liquid collecting valve or the like for sampling a chemical liquid. Among such manual valves, some manual valves are designed such that a valve element is moved by rotation of a knob through a rod (see Japanese Unexamined Patent Application Publication No. 2004-324661 and Japanese Unexamined Patent Application Publication No. 2005-344918).

An explanation for a manual valve disclosed in JP2004-324661A is now given referring to FIG. 16.

A manual valve 301A is constituted of a valve main body 303, a diaphragm retainer 304, a cylinder 305, a diaphragm valve element 309, a valve rod 310, a knob 312A, and others. The diaphragm valve element 309 (valve element) includes a peripheral portion firmly held between the valve main body 303 and the diaphragm retainer 304 and is threaded with the valve rod 310 in a center portion thereof. The valve rod 310 is continuously urged upward by a spring 311. The knob 312A having a surface contact with an upper end portion of the valve rod 310, is threadedly engaged with the cylinder 305.

In the manual valve 301A of JP2004-324661A, when the knob 312A is turned to move upward/downward as being held in contact with the valve rod 310, the valve rod 310 is moved in an opening/closing direction against the urging force of the spring 311, so that a valve opening degree can be adjusted.

Then, a manual valve disclosed in JP2005-344918A is explained referring to FIG. 17.

A manual valve 401 is constituted of a handle (knob) 411, a sliding nut 413, a piston 423, a spring 426, a valve element 433, a valve seat 434, and others.

A thread portion 413a of the sliding nut 413 is threadedly engaged with a thread portion 423a of the piston 423 to connect the sliding nut 413 with the piston 423, so that the sliding nut 413 is rotated integrally with the handle 411. The valve element 433 includes a peripheral end portion 433a which is firmly held between the valve main body 431 and a lower piston cylinder 423 and is integrally connected with the piston 423 in its center portion. The piston 423 is continuously urged downward by a metal-made spring 426.

In the manual valve 401 of JP2005-344918A, when the handle 411 is rotated in a valve closing direction, the piston 423 is moved downward by screw feeding with respect to the sliding nut 413 to bring the valve element 433 downward into contact with the valve seat 434 by the urging force of the spring 426. When the valve element 433 is placed in contact with the valve seat 434 into a valve closing position, the thread portion 413a of the sliding nut 413 and the thread portion 423a of the piston 423 are disengaged, so that the handle 411 turns free.

In the manual valve as disclosed in JP2004-324661A, the rod is threadedly moved by rotation of the knob while the rod is in contact with the knob, thereby moving the valve element. However, in a valve closing operation by turning the knob, the knob could be rotated more than necessary by excessive torque even after the valve element came to contact with the valve seat. Then, the valve element connected integrally with the piston could excessively press the valve seat, resulting in damages such as deformation or breakage of the valve seat.

Moreover, since the manual valve of JP2005-344918A is designed so that the valve element is brought into contact with the valve seat by the urging force of the spring to close the valve, the manual valve tends to be complicated in structure and increase in the number of components, leading to cost increase.

Further, installation of the spring causes upsizing of the manual valve, making it difficult to minimize a size of the manual valve. Furthermore, since the metal-made spring is provided to make the valve element into contact with the valve seat for the valve closing, there is a possibility that leaking chemical liquid intrudes into the manual valve from a peripheral portion of the knob, and such chemical liquid could contact with or attach to the spring. Accordingly, the spring suffers from deterioration, erosion, rust or the like caused by the leaking chemical liquid, and thus the manual valve could fail to close appropriately.

SUMMARY OF THE INVENTION

The present invention has been made in view of the above circumstances and has an object to provide a manual valve in which a valve element is moved by use of a rod, and the manual valve is manufactured with lower cost and less space and is designed to prevent a valve seat from being damaged even if a knob is rotated by larger torque than a predetermined value.

(1) To achieve the purpose of the invention, there is provided a manual valve comprising an inlet port; an outlet port; a valve seat formed in a passage for fluid, communicating the inlet port to the outlet port; a valve element that is movable into or out of contact with the valve seat to control a flow of the fluid; a rod connected to the valve element; and a knob for moving the rod by screw feeding in an opening/closing direction of the valve element. The manual valve is arranged to move the valve element through the rod by rotation of the knob, wherein the rod is formed with an external thread portion on an outer periphery thereof, the rod being unconnected to the knob but being held against rotation. The manual valve further comprises a rod feeding member of a cylindrical shape, the rod feeding member being rotatably held and internally formed with an internal thread portion to be threadedly engaged with the external thread portion of the rod, and an engagement member fixed to the knob, the engagement member being elastically deformable to be engaged with the rod feeding member and disengaged from the rod feeding member when a larger torque than a predetermined value is applied to the engagement member.

(2) In the above manual valve (1), preferably, the rod feeding member comprises an engagement part including a plurality of one of recesses circumferentially intermittently arranged at predetermined pitches, protrusions circumferentially intermittently arranged at predetermined pitches, and circumferentially continuous faces, and the engagement member is engaged with the engagement part.

(3) In the above manual valve (2), preferably, the engagement member is a separate member from the knob and is engaged with the knob to elastically hold a part of the engagement part of the rod feeding member.

(4) In the above manual valve (2), preferably, the engagement member includes a plurality of claws integral with the knob, extending in the opening/closing direction and elastically holding a part of the engagement part of the rod feeding member radially inwardly.

(5) In the above manual valve (3), preferably, at least one of the engagement member and the rod feeding member is made of resin.

(6) In the above manual valve (1), preferably, the knob is formed with a through hole on a center, the rod comprises an indicator at an end to identify a position of the rod and is inserted in the rod feeding member, and the indicator is movable inside and outside the through hole of the knob in accordance with movement of the rod.

(7) The above manual valve (1), preferably, comprises a restriction member for restricting elastic deformation of the engagement member so as to disengage the rod feeding member.

(8) In the above manual valve (7), preferably, the restriction member is integrally formed with the knob.

(9) In the above manual valve (7), preferably, the predetermined value of the torque is determined by elastic deformation force of the restriction member.

(10) In the above manual valve (9), preferably, the engagement member comprises a plurality of divided layers.

(11) In the above manual valve (8), preferably, a predetermined value of the torque is determined by elastic deformation force of the restriction member.

(12) In the above manual valve (11), preferably, the engagement member comprises a plurality of divided layers.

(13) In the above manual valve (1), preferably, the engagement member comprises a plurality of divided layers.

(14) The above manual valve (1), preferably, further comprises a holding member for the rod feeding member and a sliding sheet held between the rod feeding member and the holding member.

(15) In the above manual valve (14), preferably, the sliding sheet is made of PTFE.

(16) In the above manual valve (1), preferably, at least one of contact surfaces of the rod feeding member and the holding member is applied with surface treatment.

(17) In the above manual valve (16), preferably, the surface treatment is fluorine coating.

(18) In the above manual valve (1), preferably, the rod feeding member and the holding member are made of different materials with different frictional coefficients.

(19) In the above manual valve (18), preferably, the rod feeding member is made of PFA and the holding member is made of PVDF.

(1) In the present invention, a manual valve comprises an inlet port, an outlet port, a valve seat formed in a passage for fluid, communicating the inlet port to the outlet port, a valve element that is movable into or out of contact with the valve seat to control a flow of the fluid, a rod connected to the valve element, and a knob for moving the rod by screw feeding in an opening/closing direction of the valve element. The manual valve is arranged to move the valve element through the rod by rotation of the knob. The rod is formed with an external thread portion on an outer periphery thereof, the rod being unconnected to the knob but being held against rotation. The manual valve further comprises a rod feeding member of a cylindrical shape, the rod feeding member being rotatably held by the body and internally formed with an internal thread portion to be threadedly engaged with the external thread portion of the rod, and an engagement member fixed to the knob to be elastically deformably engaged with the rod feeding member and disengaged from the rod feeding member when a larger torque than a predetermined value is applied to the engagement member, thereby preventing the rod feeding member from rotating with the knob. On the other hand, the rod is unconnected to the knob but held against rotation. If the rod feeding member is not rotated, the rod cannot be moved in the opening/closing direction relative to the rod feeding member by screw feeding through engagement between the external thread portion of the rod and the internal thread portion of the rod feeding member.

Consequently, even if the knob is rotated with the larger torque than the predetermined value, neither the valve element is moved with the rod nor the valve element presses the valve seat excessively, so that the valve seat can be prevented from getting damaged due to pressure of the valve element.

(2) In the present invention, preferably, the rod feeding member comprises an engagement part including a plurality of one of recesses circumferentially intermittently arranged at predetermined pitches, protrusions circumferentially intermittently arranged at predetermined pitches, and circumferentially continuous faces. The engagement member is engaged with the engagement part of the rod feeding member. Therefore, when the knob is rotated with the larger torque than the predetermined value, the engagement between the engagement part of the rod feeding member and the engagement member can be easily unlocked.

(3) In the present invention, preferably, the engagement member is a separate member from the knob and is engaged with the knob to elastically hold a part of the engagement part of the rod feeding member. Therefore, by the simple use of removal of the engagement member, the transmission of rotation of the knob to the rod feeding member is easily allowed or released. More than that, compared to a conventional manual valve provided with a spring, the manual valve of the present invention can be made compact in structure, leading to cost reduction.

(4) In the present invention, preferably, the engagement member includes a plurality of claws integral with the knob, extending in the opening/closing direction and elastically holding a part of the engagement part of the rod feeding member radially inwardly. Therefore, when the knob is rotated with the larger torque than the predetermined value, a part of the engagement part of the rod feeding member elasitcally grasped by the engagement member is automatically released, so that transmission of the rotation of the knob to the rod feeding member can be easily disabled.

(5) The present invention may also be employed for example as a manual valve for controlling chemical liquid or the like to be used in a semiconductor manufacturing device.

(6) In the manual valve of the present invention, since at least one of the engagement member or the rod feeding member is made of resin, even if leaking chemical liquid intrudes into the manual valve form a peripheral portion of the knob, or the manual valve is exposed to acid or alkali atmosphere, at least any one of the engagement member or the rod feeding member can be prevented from damages such as deterioration, erosion, rust or the like caused by the leaking chemical liquid. Consequently, the manual valve can restrain any operation troubles or failures caused by such damages during (i) the transmission of the rotation of the knob to the rod feeding member and (ii) the cancellation of the transmission by the engagement member, so that the manual valve can be closed appropriately.

(7) In the present invention, preferably, the knob is formed with a through hole at the diametrical center and the rod comprises an indicator at an end to identify a position of the rod and is inserted in the rod feeding member. The indicator is movable inside and outside the through hole of the knob in accordance with movement of the rod. Therefore, irrespective of an orientation of the manual valve, it can be judged at a glance whether the valve is opened or closed, and the valve opening degree can be easily identified by visual check.

(8) In the present invention, preferably, a restriction member is integrally formed with the knob. Therefore, the manual valve of the present invention can be simplified in structure with less number of components or parts, leading to cost reduction.

(9) In the manual valve of the present invention, preferably, the engagement member is provided with the restriction member for restricting elastic deformation of the engagement member so as to disengage the rod feeding member from the engagement member. Therefore, the restriction member is designed to have restriction force, i.e., elastic deformation force at a predetermined value. Thereby, the torque for disengaging the engagement member from the rod feeding member can be kept at a predetermined value.

If the torque is maintained at the predetermined value depending only on the elastic deformation of the engagement member, the torque could not be kept to the predetermined value when the elastic force is changed by deterioration or the like of the engagement member. On the other hand, the restriction member restricts the elastic deformation of the engagement member to a predetermined degree. Even if the engagement member is deteriorated, the torque can be kept at the predetermined value.

Moreover, since the engagement member is integrally formed with the knob, the above-mentioned advantages can be realized without increasing the number of components.

(10) The manual valve according to the present invention may comprise sliding sheets (for example, PTFE (polytetrafluoroethylene) sheets) firmly held between the rod feeding member and the body. As the sliding sheets, a first sliding sheet is placed between the rod feeding member and the body to be in contact with the body when the rod feeding member is moved in the valve closing direction and a second sliding sheet is placed between the rod feeding member and the body to be in contact with the body when the rod feeding member is moved in the valve opening direction.

(11) In the case where the rod feeding member and the body are made of same material (for example, PVDF (polyvinylidene difluoride)), for example, when the knob is tightened to move the rod downward in the valve closing direction with a larger torque than a predetermined value, the engagement part is disengaged, making the knob turn free. Accordingly, even if the knob is subsequently rotated in the valve opening direction, the knob will turn free and thus the valve may not be opened properly. On the contrary, when the knob, i.e. the rod is rotated in the valve opening direction with the larger torque than the predetermined value, the engagement member is disengaged, making the knob turn free. Accordingly, even if the knob is rotated in the valve closing direction, the knob will turn free and the valve may not be closed properly.

However, in the present invention, the sliding sheet (for example, PTFE sheet) is placed between the rod feeding member and the body. Thereby, the torque to rotate the knob in the valve opening direction can be reduced to about 70% of the torque applied to the knob when turns free. Consequently, even after the knob is tightened to move the rod in the valve closing direction with the larger torque than the predetermined value, causing the engagement member to be disengaged and the knob to turn free, the knob can be rotated in the valve opening direction without further turning free, thereby reliably achieving the valve opening. On the contrary, even after the knob is rotated in the valve opening direction with the larger torque than the predetermined value, causing the engagement member to be disengaged and the knob to turn free, the knob can be rotated in the valve closing direction without further turning free, thereby reliably achieving valve closing.

(12) Further, in the present invention, at least any one of contact surfaces between the rod feeding member and the body is provided with surface treatment (for example, fluorine coating). This makes it possible to reduce the torque to rotate the knob in the valve opening direction to about 70% of the torque applied to the knob when turns free. Consequently, eve after the knob is tightened to move the rod downward in the valve closing direction with the larger torque than the predetermined value, causing the engagement member to be disengaged and the knob to turn free, the knob can be rotated in the valve opening direction without further turning free, thereby reliably achieving the valve opening. On the contrary, even after the knob is rotated in the valve opening direction with the larger torque than the predetermined value, causing the engagement member to be disengaged and the knob to turn free, the knob can be rotated in the valve closing direction without further turning free, thereby reliably achieving valve closing.

(13) Finally, in the manual valve of the present invention, the rod feeding member and the body are made of different materials with different frictional coefficients (for example, the rod feeding member is made of PFA (tetrafluoroethylene perfluoroalkylvinyl ether copolymer), and the body is made of PVDF). Consequently, this makes it possible to reduce the torque to rotate the knob in the valve opening direction to about 70% of the torque applied to the knob when turns free. Therefore, even after the knob is tightened to move the rod downward in the valve closing direction with the larger torque than the predetermined value, causing the engagement member to be disengaged and the knob to turn free, the knob can be rotated in the valve opening direction without further turning free, thereby reliably achieving the valve opening. On the contrary, even after the knob is rotated to the valve opening direction with the larger torque than the predetermined value, causing the engagement member to be disengaged and the knob to turn free, the knob can be rotated in the valve closing direction without further turning free, thereby reliably achieving valve closing.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIG. 4A is a sectional side view of a sliding nut in the first embodiment;

FIG. 4B is a sectional view of the sliding nut taken along a line C-C in FIG. 4A;

DETAILED DESCRIPTION OF THE PREFERRED EMBODIMENTS

A detailed description of preferred embodiments of the present invention will now be given referring to the accompanying drawings.

First Embodiment

Figure 1:
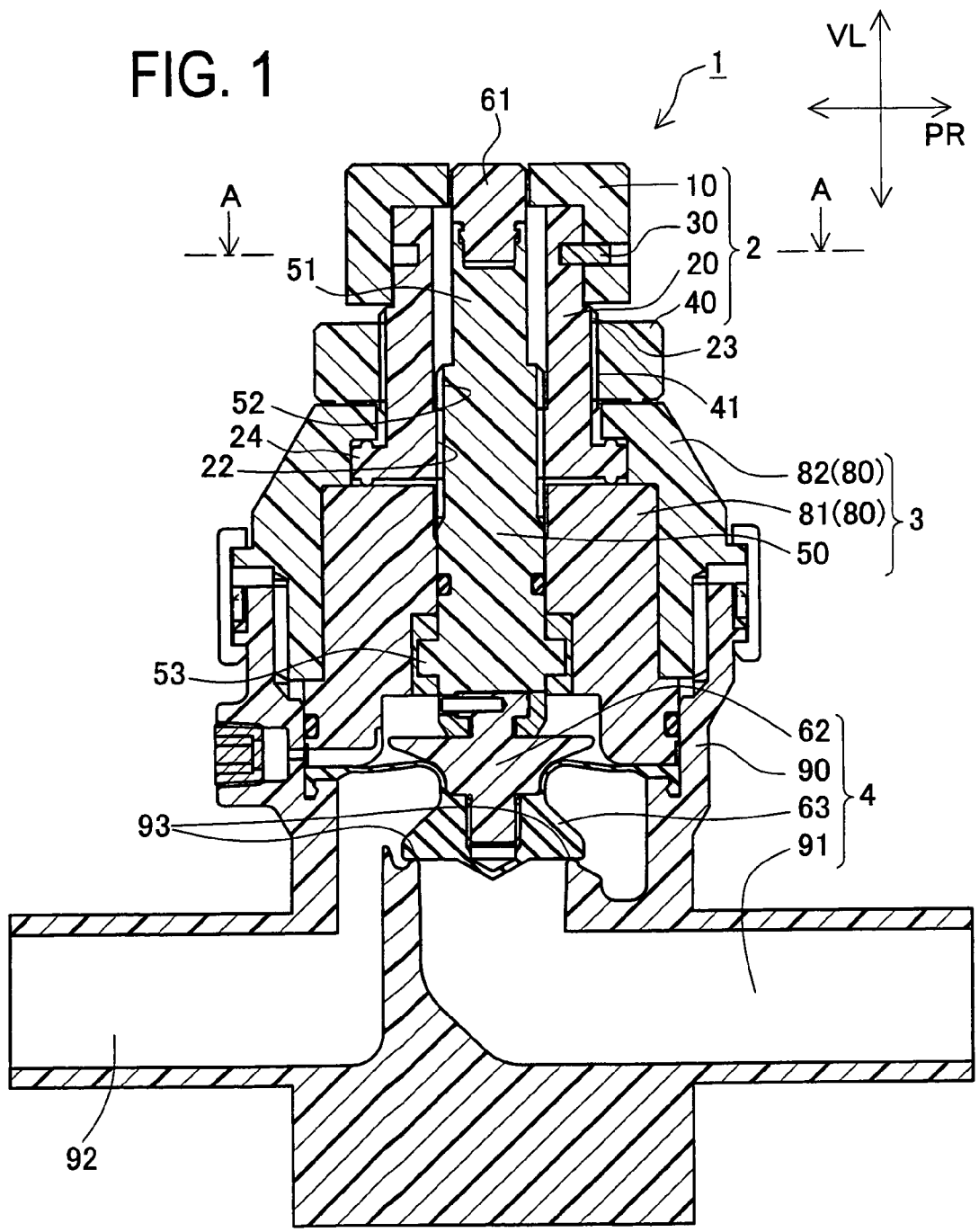
FIG. 1 is an explanatory view showing a structure of a manual valve in a first embodiment.
Figure 2:
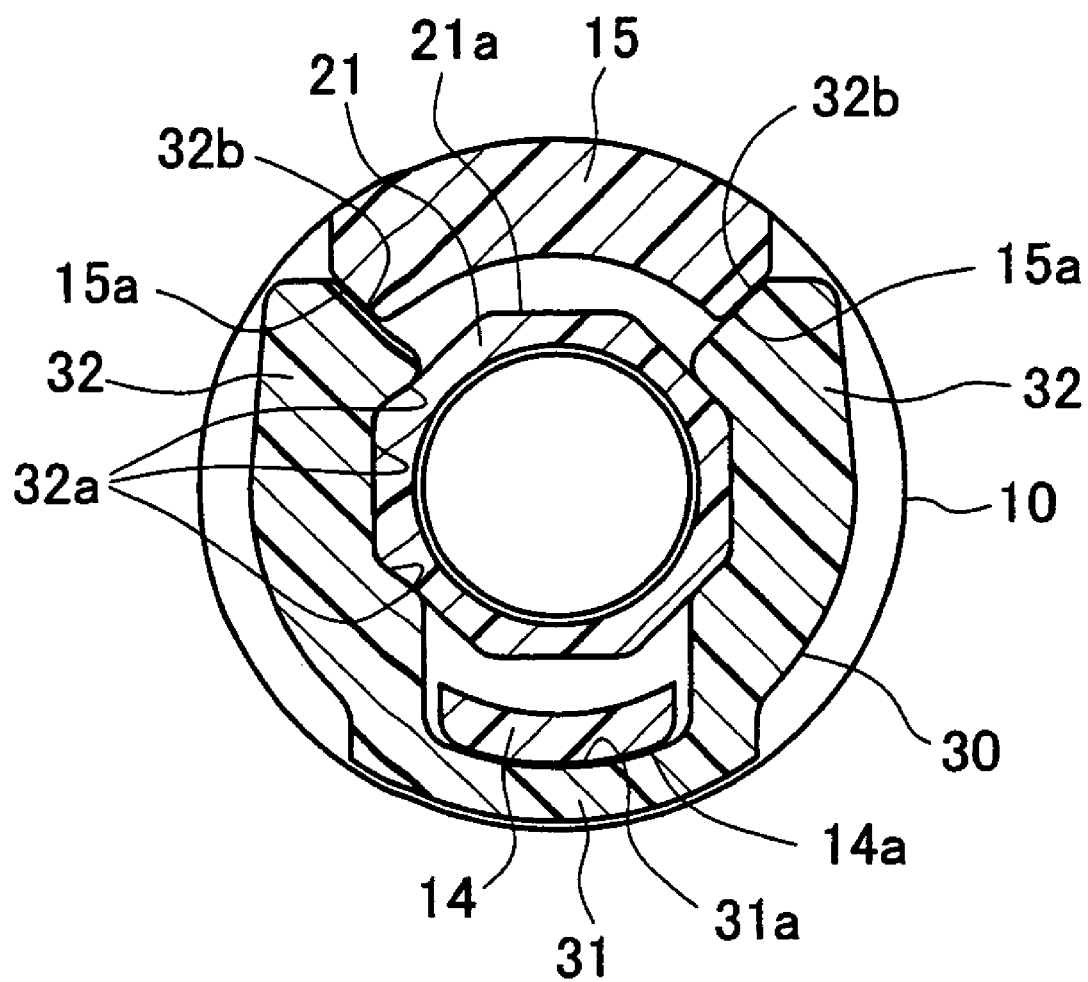
FIG. 2 is a sectional view of main parts of the manual valve taken along a line A-A in FIG. 1.
Figure 3A:
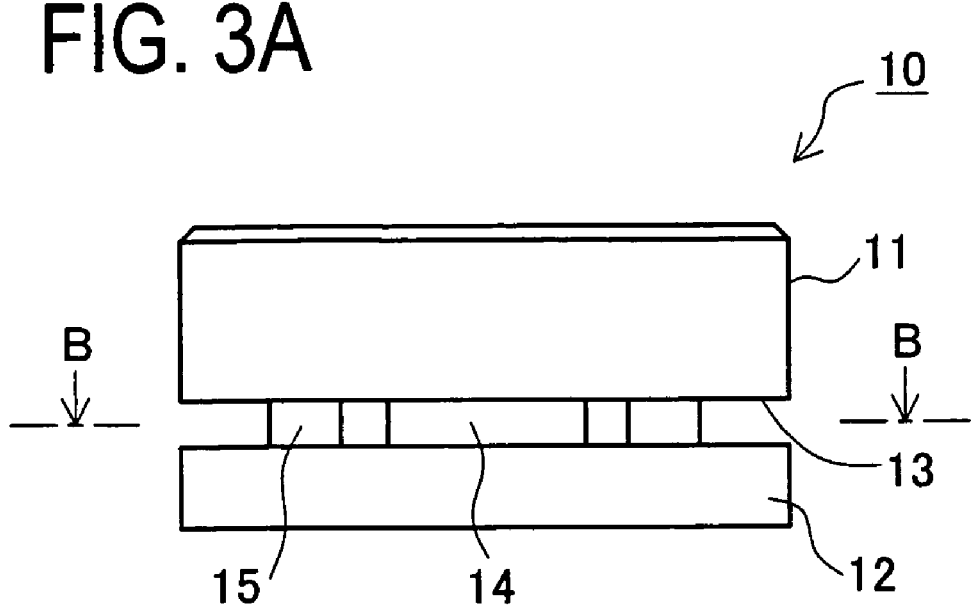
FIG. 3A is a side view of a knob in the first embodiment.
Figure 3B:
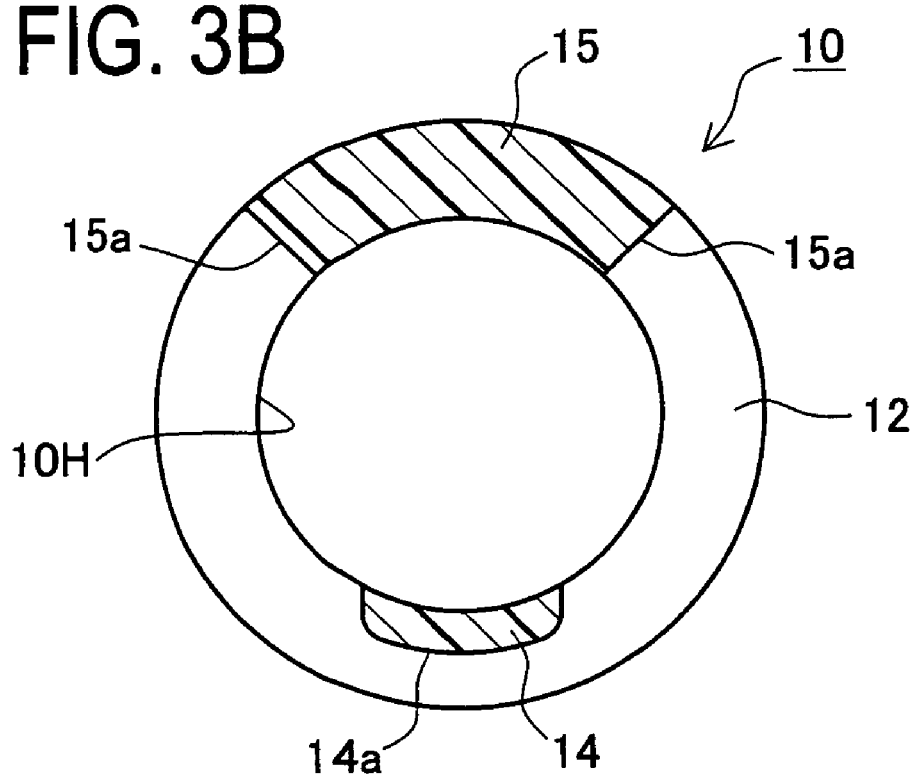
FIG. 3B is a sectional view of the knob taken along a line B-B in FIG. 3A.
Figure 5A:
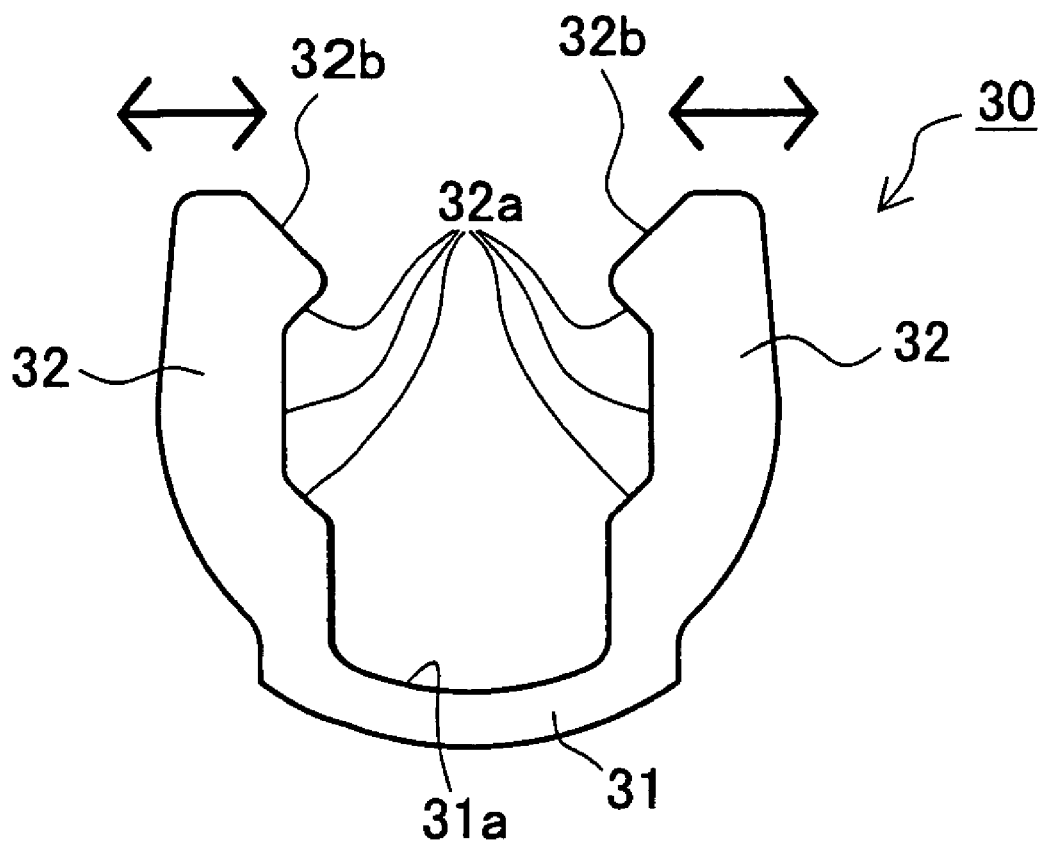
FIG. 5A is a plan view of a clip provided in the manual valve in the first embodiment.
Figure 5B:
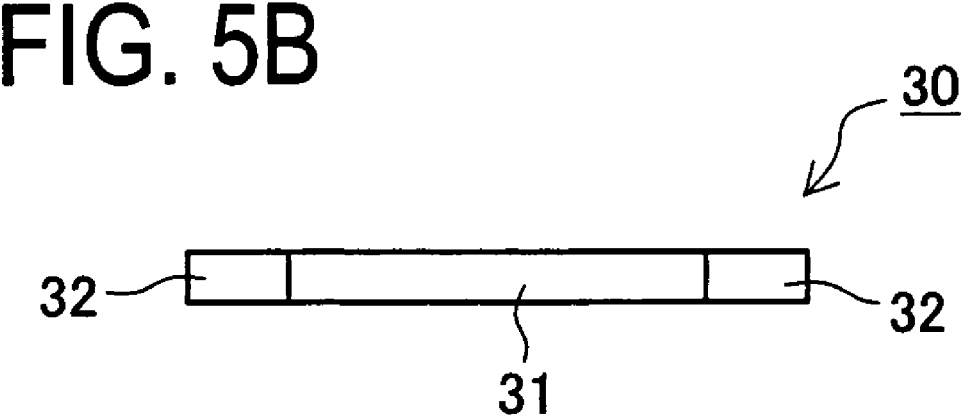
FIG. 5B is a side view of the clip provided in the manual valve in the first embodiment.

FIG. 1 is an explanatory view showing a manual valve in the first embodiment. FIG. 2 is a sectional view of main parts of the manual valve taken along a line A-A in FIG. 1. FIG. 3A is a side view of a knob and FIG. 3B is a sectional view of the knob taken along a line B-B in FIG. 3A. FIG. 4A is a sectional side view of a sliding nut and FIG. 4B is a sectional view of the sliding nut taken along a line C-C in FIG. 4A. FIG. 5A is a plan view and FIG. 5B is a side view of a clip provided in the manual valve in the first embodiment. In the following explanation, a vertical direction is defined as an opening/closing direction VL and a lateral direction is defined as a radial direction PR as indicated with intersecting arrows in FIG. 1.

The manual valve 1 is, for example, employed in a semiconductor manufacturing device, as a chemical liquid valve for controlling a flow of a chemical liquid to be supplied to a chemical liquid supply unit or as a chemical liquid collecting valve or the like for sampling a chemical liquid.

The manual valve 1 is constituted of an operation member 2, a motion transmission member 3, and a valve mechanism 4 as shown in FIG. 1.

The operation member 2 is provided with a knob 10, a sliding nut 20, a clip 30, a lock ring 40, and others.

The knob 10 is, for example, made of resin having acid resistance (or alkali resistance) and oil resistance such as fluorine resin, and as shown in FIGS. 3A and 3B, is of a nearly cylindrical shape with a through hole 10H formed at the diametrical center to extend in the opening/closing direction VL. In the first embodiment, the knob 10 is constituted of a first annular portion 11, a second annular portion 12, and a clip mounting portion 13. The first and second annular portions 11 and 12 are separated from each other in the opening/closing direction VL with the clip mounting portion 13 intervening therebetween, and connected to each other by a first locking member 14 and a second locking member 15, each of which is circularly formed in the clip mounting portion 13. As shown in FIG. 3B, the first and second locking members 14 and 15 are placed in diametrical opposed positions. The first locking member 14 includes a contact surface 14a facing outwardly in the radial direction PR. The second locking member 15 includes two contact surfaces 15a, 15a in a radial direction of the knob 10.

The sliding nut 20 corresponding to a rod feeding member in the present invention is, for example, made of resin having acid resistance (or alkali resistance) and oil resistance such as fluorine resin. As shown in FIGS. 1 and 4A, the sliding nut 20 is of a nearly cylindrical shape, comprising a through hole 20H formed at the diametrical center to extend in the opening/closing direction VL. The sliding nut 20 includes an internal thread portion 22 in the through hole 20H, the thread portion 22 being engaged with an external thread portion 52 of a rod 50. Further, the sliding nut 20 is provided with an engagement part 21 closer to one end in the opening/closing direction VL. The engagement part 21 is formed with eight outer surfaces 21a, which are continuous in an octagonal shape, on a radially inner side than an outer periphery of the sliding nut 20 as shown in FIG. 4B. The dimension of the engagement part 21 in the opening/closing direction VL is slightly bigger than a thickness of the clip 30 (the dimension in the vertical direction in FIG. 5B).

Moreover, the sliding nut 20 is also formed with an external thread 23 on an outer periphery thereof being engaged with an internal thread 41 of the lock ring 40. When the lock ring 40 is placed in contact with a sliding nut holding member 82 by engagement with the sliding nut 20, the lock ring 40 locks the sliding nut 20 against rotation. Further, on an outer periphery of the sliding nut 20 closer to the other end in the opening/closing direction VL, a flange 24 is provided in order to prevent the sliding nut 20 from moving in the opening/closing direction VL and to hold the sliding nut 20 itself in place.

The sliding nut 20 is held, through the flange 24, by a body 80 of the motion transmission member 3. Specifically, the body 80 includes a rod holding member 82 and a sliding nut holding member 81. The sliding nut 20 is rotatably held by the sliding nut holding member 82 while the flange 24 is supported on the rod holding member 81.

In the first embodiment, as shown in FIGS. 1 and 4A, the flange 24 is formed with projections protruding upward and downward in the opening/closing direction VL. Having such projections enables the flange 24 to have a small contact area with each of the rod holding member 81 and the sliding nut holding member 82, so that the sliding nut 20 can be easily rotated with respect to the rod holding member 81 and the sliding nut holding member 82 respectively.

The clip 30, corresponding to an engagement member in the present invention, is made of resin with acid resistance (or alkali resistance) and oil resistance such as fluorine resin. As shown in FIG. 5A, the clip 30 shaped like the letter C includes a fixing portion 31 and a pair of holding portions 32 extending from both ends of the fixing portion 31. The holding portions 32 are elasitcally deformable in an inward-outward direction (indicated with two arrows in FIG. 5A) to move apart from each other and move back to respective original positions.

The fixing portion 31 includes a contact surface 31a which comes into contact with the contact surface 14a of the first locking portion 14 of the knob 10 when the knob 10 and the sliding nut 20 are connected together by the clip 30. Further, the holding portions 32 include first contact surfaces 32b which come into contact with the contact surfaces 15a of the second locking portion 15 in the knob 10. Furthermore, the holding portions 32 include second contact surfaces 32a respectively, each contact surface 32a being able to contact with any one of the eight faces of the outer surfaces 21a of the engagement part 21.

In the first embodiment, as shown in FIG. 2, the knob 10 and the sliding nut 20 are connected as follows. First, the contact surface 31a of the fixing portion 31 of the clip 30 is brought into contact with the contact surface 14a of the first locking portion 14 of the knob 10. Then, the six, second contact surfaces 32a of the holding portions 32 are brought into contact with six of the eight, outer surfaces 21a of the engagement part 21. At the same time, the first contact surfaces 32b of the holding portions 32, 32 are brought into contact with the contact surfaces 15a, 15a of the second locking portion 15 of the knob 10.

As mentioned above, the clip 30 is fixed in engagement with the first and second locking portions 14 and 15 of the knob 10 and the engagement part 21 of the sliding nut 20, thus holding six of the eight outer surfaces 21a of the engagement part 21 of the sliding nut 20. In this manner, the knob 10 and the sliding nut 20 are integrally connected, so that the sliding nut 20 can be circumferentially rotated with the knob 10 in accordance with rotation of the knob 10.

Next, the motion transmission member 3 is explained below.

The motion transmission member 3 includes the rod 50, the body 80 and others as mentioned above.

The rod 50 is, for example, made of resin with acid resistance (or alkali resistance) and oil resistance such as fluorine resin. Further, the rod 50 on an outer periphery thereof includes the aforementioned external thread portion 52 and a rotation stopper member 53 which prevents the rod 50 from rotation on its axis. The rod 50 is not directly connected with the knob 10, but is movably placed inside the rod holding member 81, the through hole 10H of the knob 10, and the through hole 20H of the sliding nut 20 in the opening/closing direction VL. In the rod 50, the rotation stopper member 53 is circumferentially engaged with an unshown part of the rod holding member 81 to prevent the rod 50 from rotating inside the rod holding member 81.

The rod 50 is provided, at one end portion 51, with an indicator 61 for indicating a position of the rod 50. The indicator 61 is placed movably inside the through hole 10H of the knob 10. In the present embodiment, the indicator 61 is placed inside the through hole 10H (see FIG. 1) during valve closing. When the rod 50 is moved upward from a position shown in FIG. 1 for valve opening, the indicator 61 is moved upward to protrude from the first annular portion 11 of the knob 10.

Further, it is not shown but the indicator 61 is provided with marks or codes to indicate a valve opening degree. In this embodiment, the marks or codes are applied as color tapes, color coatings or the like providing color coding corresponding to the valve opening degree.

An explanation for the valve mechanism 4 is given below.

The valve mechanism 4 includes a valve element holding member 62, a valve element 63, a valve body 90, and others. The valve element holding member 62 is integrally firmly fixed with the other end portion (a lower end in FIG. 1) of the rod 50, and is also firmly fixed to the valve element 63 serving as a diaphragm. The valve body 90 includes a first port 91, a second port 92, and a valve seat 93. The valve body 90 is integrally firmly fixed with the body 80.

In the manual valve 1, as will be described later, when the knob 10 is rotated, the rod 50 is moved in the opening/closing direction VL, and accordingly the valve element 63 is moved in the opening/closing direction VL through the rod 50. When the rod 50, i.e. the valve element 63 is moved to a valve closing side in the opening/closing direction VL (lower side in FIG. 1) to come into contact with the valve seat 93, the manual valve 1 is placed in the valve closed state. On the contrary, when the valve element 63 is moved to a valve opening side in the opening/closing direction VL (upper side in FIG. 1) to separate from the valve seat 93, the manual valve 1 is placed in the valve opened state.

An operation of the manual valve 1 is explained below.

Firstly, an explanation is given to the motions that transmit the rotation of the knob 10 to the sliding nut 20 through the clip 30 to move the rod 50 in the opening/closing direction VL.

In advance, the lock ring 40 is separated from the sliding nut holding member 82 to unlock the rotation of the sliding nut 20 so that the sliding nut 20 is rotatable.

The clip 30 is engaged with the first and second locking portions 14 and 15 of the knob 10 and the engagement part 21 of the sliding nut 20 respectively, thus holding or grasping six of the eight outer surfaces 21a of the engagement part 21 of the sliding nut 20. In this manner, the knob 10 and the sliding nut 20 are integrally connected. Since the sliding nut 20 is held by its flange 24 and the body 80 against movement in the opening/closing direction VL, the sliding nut 20 is rotated in the same direction with the knob 10 when the knob 10 is rotated. The internal thread portion 22 of the sliding nut 20 is threadedly engaged with the external thread portion 52 of the rod 50, and also, the rotation of the rod 50 on its axis is disabled in the rod holding member 81. Consequently, when the knob 10 is rotated, the sliding nut 20 is simultaneously rotated, so that the rod 50 can be moved in the opening/closing direction VL relative to the sliding nut 20 by screw feeding of the engaged internal thread portion 22 of the sliding nut 20 and the external thread portion 52 of the rod 50.

An operation for shifting the manual valve 1 from the valve closed state to the valve opened state is explained.

In the manual valve 1 in the first embodiment, the internal thread portion 22 of the sliding nut 20 and the external thread portion 52 of the rod 50 are both left-handed screws. Therefore, when the knob 10 is rotated clockwise, the rod 50 is moved to the valve closing side. On the other hand, when the knob 10 is rotated counter-clockwise, the rod 50 is moved to the valve opening side.

To open the valve, the knob 10 is rotated in one direction (counter-clockwise), causing the sliding nut 20 to rotate in the same direction. With this rotation of the sliding nut 20, the rod 50 is moved to the valve opening side in the opening/closing direction VL (upward in FIG. 1). Accordingly, the valve element 63 connected to the rod 50 is separated from the valve seat 93 to open the valve. At this time, an operator can confirm the valve opening degree referring to the marks or codes of the indicator 61 while rotating the knob 10.

An operation for shifting the manual valve 1 from the valve opened state to the valve closed state is explained below.

To close the valve, when the knob 10 is rotated in the opposite direction (clockwise) with torque of less than or equal to a predetermined value, the sliding nut 20 and the knob 10 are rotated together in the same direction. With this rotation of the sliding nut 20, the rod 50 is moved to the valve closed side in the opening/closing direction VL (downward in FIG. 1).

Even if the knob 10 is rotated further after the valve element 63 connected to the rod 50 is brought into contact with the valve seat 93, the rod 50 is not allowed to further move in a valve closing direction (downward in FIG. 1) lower than a contact position of the valve element 63 and the valve seat 93. Consequently, the torque to rotate the knob 10 becomes larger than the predetermined value.

In the manual valve 1, the knob 10 and the sliding nut 20 are integrally connected together by the clip 30. While the contact surface 14a of the first locking portion 14 of the knob 10 and the contact surface 31a of the fixing member 31 of the clip 30 are kept in contact, when the larger torque than the predetermined value is applied, the holding portions 32 of the clip 30 are elastically deformed outwardly in the inward-outward direction. Therefore, even if an operator keeps rotating the knob 10 after the valve element 63 and the valve seat 93 are brought into contact, the holding portions 32 are elastically deformed to separate the second contact surfaces 32a from the outer surfaces 21a of the engagement part 21 of the sliding nut 20, thereby releasing the outer surfaces 21a. That is, the holding portions 32, 32 are disengaged from the engagement part 21. Accordingly, the knob 10 and the clip 30 turn free in a circumferential direction with respect to the engagement part 21 of the sliding nut 20, so that the rotation of the knob 10 is not transmitted to the sliding nut 20.

In short, the manual valve 1 in the first embodiment comprises the valve seat 93 placed in the chemical liquid flow passage communicating with the first and second ports 91 and 92, the valve element 63 movable into or out of contact with the valve seat 93 to control the flow of the chemical liquid, the rod 50 connected to the valve element 63, and the knob 10 for moving the rod 50 by screw feeding mechanism in the opening/closing direction VL with respect to the valve element 63. The manual valve 1 is arranged to move the valve element 63 through the rod 50 by the rotation of the knob 10. The rod 50 including the external thread portion 52 on an outer periphery thereof is not connected to the knob 10 but is prevented from rotating. Further, the manual valve 1 includes the cylindrically shaped sliding nut 20 rotatably held by the body 80 and formed with the internal thread portion 22 to be engaged with the external thread portion of the rod 50 on its inner periphery, and further includes the clip 30 fixed with the knob 10 and engaged with the sliding nut 20 to be elastically deformable. The clip 30 is deformed to be disengaged when the larger torque than the predetermined value is applied. Therefore, when the knob 10 is rotated with the larger torque than the predetermined value, the clip 30 releases the knob 10 from the engagement with the sliding nut 20. The sliding nut 20 is not allowed to further rotate. On the other hand, the rod 50 is not connected to the knob 10 and is not allowed to rotate inside the rod holding member 81 by the rotation stopper member 53. Therefore, if the sliding nut 20 is not rotated, the rod 50 cannot be moved in the opening/closing direction VL relative to the sliding nut 20 by screw feeding through engagement between the external thread portion 52 of the rod 50 and the internal thread portion 22 of the sliding nut 20.

As a result, even if the knob 10 is rotated with the larger torque than the predetermined value, neither the valve element 63 is moved with the rod 50 nor the valve element 63 presses the valve seat 93 excessively, so that the valve seat 93 can be prevented from getting damaged due to pressure of the valve element 63.

Additionally, in the manual vale 1 of the first embodiment, the sliding nut 20 includes the engagement part 21 formed with the eight outer surfaces 21a annularly connected, and the clip 30 is engaged with the engagement part 21 of the sliding nut 20. Therefore, when the knob 10 is rotated with the larger torque than the predetermined value, the engagement between the engagement part 21 of the sliding nut 20 and the clip 30 can be easily unlocked.

Furthermore, in the manual valve 1 of the first embodiment, the clip 30 is formed separately from the knob 10 and placed in engagement with the knob 10 to grasp the six of the eight outer surfaces 21a of the engagement part 21 of the sliding nut 20. By the simple use or removal of the clip 30, the transmission of rotation of the knob 10 to the sliding nut 20 is easily allowed or released. More than that, compared to a conventional manual valve in which a valve element is brought into contact with a valve seat by urging force of a spring for valve closing (the manual valve disclosed in JP2005-344918A), the manual valve of the present embodiment can be simplified in structure with less number of components or parts, leading to cost reduction. Moreover, since the manual valve 1 employs no spring unlike the conventional manual valve, the manual valve can be made compact.

By the way, the above-mentioned conventional manual valve with a spring is designed to bring the valve element into contact with the valve seat by use of the metal spring for valve closing, so that there is a possibility that leaking chemical liquid intrudes into the manual valve from a peripheral portion of the knob, and such chemical liquid could be put on the spring. Accordingly, the spring could suffer from deterioration, erosion, rust or the like caused by the leaking chemical liquid, and as a result, the manual valve could fail to be closed appropriately.

On the other hand, in the case where the manual valve 1 of the first embodiment is employed as the aforementioned chemical liquid valve or the chemical liquid collecting valve, transmission of the rotation of the knob 10 to the sliding nut 20 and cancellation of the transmission thereof are both made by means of the clip 30. Since both the sliding nut 20 and the clip 30 are made of resin, even if leaking chemical liquid intrudes into the manual valve 1 from a peripheral portion of the knob 10, or the manual valve 1 is exposed to acid or alkali atmosphere, the knob 10, the sliding nut 20, the clip 30 and others can be prevented from damages such as deterioration, erosion, rust or the like caused by the leaking chemical liquid. Consequently, the manual valve 1 can restrain any operation troubles or failures caused by such damages during (i) the transmission of the rotation of the knob 10 to the sliding nut 20 and (ii) the cancellation of the transmission by the clip 30, so that the manual valve can be closed appropriately.

In addition, the manual valve 1 in the first embodiment includes the knob 10 centrally provided with the through hole 10H and the rod 50 provided with the indicator 61 at its one end portion 51 for indicating the position of the rod 50 while the rod 50 is inserted in the sliding nut 20. The indicator 61 is moved upward and downward along the movement of the rod 50 inside the through hole 10H of the knob 10. Therefore, irrespective of an orientation of the manual valve 1, it can be judged at a glance whether the valve is opened or closed, and the valve opening degree can be easily identified by visual check.

Second Embodiment

Figure 6:
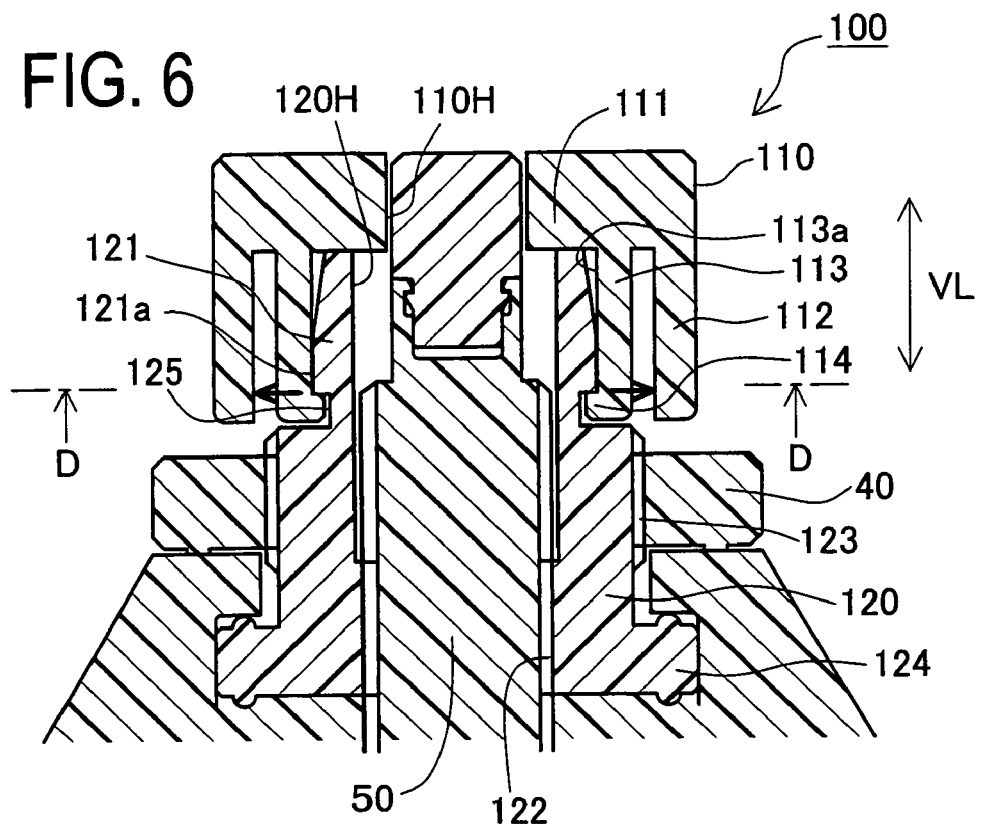
FIG. 6 is an explanatory view showing an operation member of a manual valve in a second embodiment.
Figure 7:
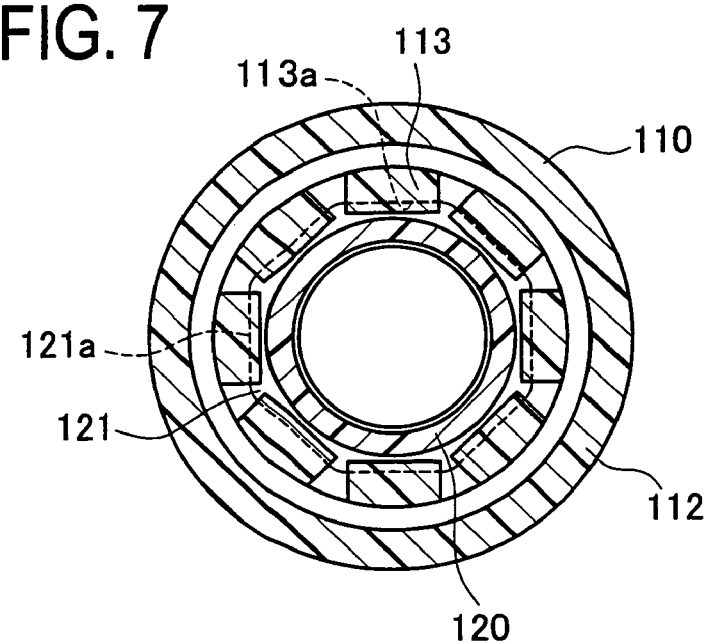
FIG. 7 is a sectional view of the operation member taken along a line D-D in FIG. 6.

A manual valve 100 according to a second embodiment is explained referring to FIGS. 6 and 7.

The manual valve 100 in the second embodiment is different from the manual valve 1 of the first embodiment in terms of structure of an operation member. In the first embodiment, the manual valve 1 includes the clip (an engagement member) 30 provided separately from the knob 10. On the other hand, in the second embodiment, the manual valve 100 includes an engagement member integrally provided with a knob.

However, the manual valve 100 of the second embodiment is similar to the manual valve 1 of the first embodiment as for the motion transmission member 3, the valve mechanism 4, and the engagement periphery of the sliding nut 20 formed in nearly octagonal outer shape, and as for material or the like of a knob 110 and a sliding nut 120.

Therefore, the following explanation is made with a focus on the differences from the first embodiment. Further, similar components are indicated with the same referential codes with the first embodiment, and explanation thereof is omitted or made simply.

FIG. 6 is an explanatory view showing an operation member of a manual valve in the second embodiment. FIG. 7 is a sectional view of the operation member taken along a line D-D in FIG. 6.

In the second embodiment, the operation member is constituted of the knob 110, the sliding nut 120, the lock ring 40 and others.

As shown in FIG. 6, the knob 110 has a nearly cylindrical shape with a through hole 110H formed at the diametrical center to extend in the opening/closing direction VL. In the second embodiment, the knob 110 includes a base portion 111, an outer peripheral portion 112, and leg portions (an engagement member) 113. The outer peripheral portion 112 is a cylindrical part extending downward from the base portion 11 in the opening/closing direction VL. The leg portions 113 are provided on a radially inner side than the outer peripheral portion 112 and arranged in eight locations spaced at equal intervals in a circumferential direction of the knob 110. Each of the leg portions 113 extends downward in the opening/closing direction VL from the base portion 111 and includes a contact surface 113a to be in contact with an outer surface 121a of an engagement part 121 of the sliding nut 120. Further, in a distal end of each leg portion 113, a hooked portion 114 is provided to be engageable with a holding groove 125 of the sliding nut 120. Each leg portion 113 is elastically deformable in an inward-outward direction to expand outward and return inward to an original position in a radial direction of the knob 110.

As shown in FIGS. 6 and 7, the sliding nut 120 is of a cylindrical shape with a through hole 120H formed at the diametrical center to extend in the opening/closing direction VL. In the through hole 120H, an internal thread portion 122 is provided to be engaged with the external thread portion 52 of the rod 50. The sliding nut 120 also includes an engagement part 121 having a tapered distal end portion at one end (an upper side in FIG. 6) in the opening/closing direction VL. The engagement part 121, as shown in FIG. 7, includes the eight outer surfaces 121a continuous in a circumferential direction thereof in an octagonal shape. The sliding nut 120 is further formed with a holding groove 125 at a position side closer to a valve closing side in the opening/closing direction VL (a lower side in FIG. 6), lower than the engagement part 121. The holding groove 125 is formed as a recess on a radially inner side than the outer surfaces 121a and along the outer surfaces 121a.

As similar to the aforementioned sliding nut 20 in the first embodiment, on the periphery of the sliding nut 120 closer to one end thereof, an external thread 123 is formed to be engaged with the internal thread 41 of the lock ring 40. Further, on the periphery of the sliding nut 120 on the other end in the opening/closing direction VL, a flange 124 is provided to support the sliding nut 120 as well as to prevent the sliding nut 120 from moving in the opening/closing direction VL. The configuration that the body 80 holds the flange 124 of the sliding nut 120 is the same as in the first embodiment and hence its explanation will not be repeated herein.

The knob 110 and the sliding nut 120 are integrally connected in a manner that the contact surfaces 113a of the leg portions 113 of the knob 110 are in contact with the outer surfaces 121a of the engagement part 121 of the sliding nut 120 and the hooked portions 114 of the leg portions 113 are engaged in the holding groove 125 of the sliding nut 120. The leg portions 113 elastically hold the engagement part 121 radially inwardly. When the knob 110 is rotated by torque less than or equal to a predetermined value, the knob 110 and the sliding nut 120 are rotated concurrently, and accordingly the rotation of the knob 110 is transmitted to the sliding nut 120.

In addition, the knob 110 is rotated to move the rod 50 in the opening/closing direction VL relative to the sliding nut 120 by screw feeding through the engagement between the internal thread portion 122 of the sliding nut 120 and the external thread 52 of the rod 50. Since such operation is the same as in the first embodiment, its explanation will not be repeated herein.

In the manual valve 100, when the knob 110 is rotated with the larger torque than the predetermined value, the leg portions 113 are elastically deformed outwardly in the inward-outward direction. Therefore, even if an operator keeps rotating the knob 10 after the valve element 63 and the valve seat 93 are brought into contact as shown in FIG. 1, the leg portions 113 are elastically deformed radially outwardly (as indicated with arrows in FIG. 6). Consequently, the contact surfaces 113a of the leg portions 113 are separated from the outer surfaces 121a of the engagement part 121 of the sliding nut 120, thereby releasing the engagement with the outer surfaces 121a. Accordingly, the leg portions 113 and the engagement part 121 are disengaged. As a result, the knob 110 is circumferentially rotated free with respect to the engagement part 121 of the sliding nut 120, so that the rotation of the knob 110 can not be transmitted to the sliding nut 120.

In the manual valve 100 of the second embodiment, the leg portions 113 of the knob 110 include claws integral with the knob 110, extending in the opening/closing direction VL to elastically grasp the engagement part 121 of the sliding nut 120 radially inwardly. Therefore, when the knob 110 is rotated with the larger torque than the predetermined value, the outer surfaces 121a of the engagement part 121 of the sliding nut 120 elasitcally grasped by the leg portions 113 are automatically released, so that transmission of the rotation of the knob 110 to the sliding nut 120 can be easily disabled.

Furthermore, compared to the conventional manual valve in which a valve element is brought into contact with a valve seat by urging force of a spring for valve closing (the manual valve disclosed in JP2005-344918A), the manual valve 100 in the second embodiment can be simplified in structure with less number of components or parts, leading to cost reduction. Moreover, the manual valve 100 employs no spring unlike the conventional manual valve, the manual valve 100 can be made compact.

Third Embodiment

Figure 8:
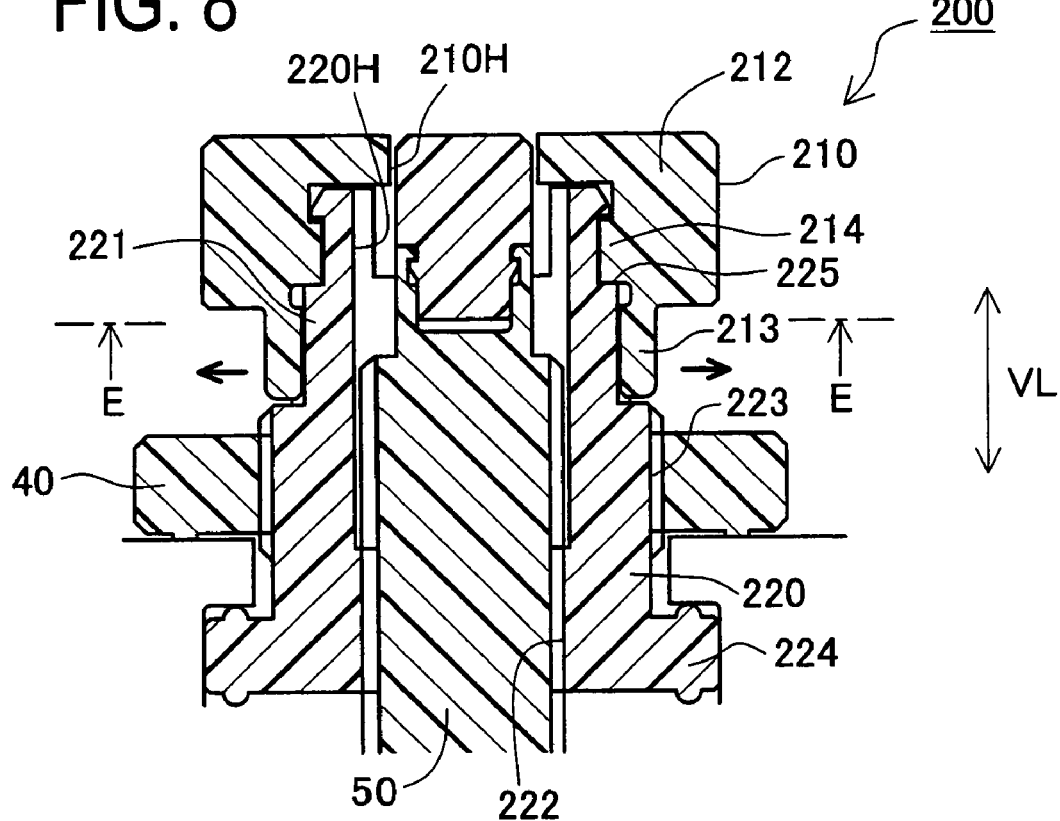
FIG. 8 is an explanatory view showing an operation member of a manual valve in a third embodiment.
Figure 9:
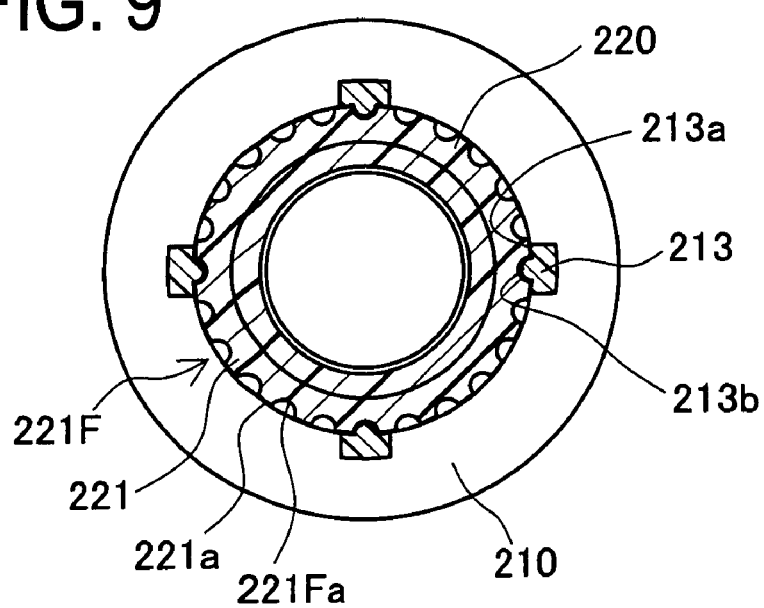
FIG. 9 is a sectional view of the operation member taken along a line E-E in FIG. 8.

A manual valve 200 according to a third embodiment is explained referring to FIGS. 8 and 9.

The manual valve 200 of the third embodiment is different from the manual valve 100 of the second embodiment in terms of structure of an operation member and each shape of a knob 210 and an engagement part 221 of a sliding nut 220.

However, the manual valve 200 of the third embodiment is similar to the manual valve 100 of the second embodiment in that the motion transmission member 3, the valve mechanism 4, and the engagement member integrally formed with the knob 210, and that leg portions 213 of the knob 210 elastically hold the engagement part 221 of the sliding nut 220 radially inwardly.

Therefore, the following explanation is made with a focus on the differences from the first and second embodiments. Further, similar components are indicated with the same referential codes with the first and second embodiments, and explanation thereof is omitted or made simply.

FIG. 8 is an explanatory view showing the operation member of the manual valve in the third embodiment. FIG. 9 is a sectional view of the operation member taken along a line E-E in FIG. 8.

In the third embodiment, the operation member is constituted of the knob 210, the sliding nut 220, the lock ring 40 and others.

As shown in FIG. 8, the knob 210 has a nearly cylindrical shape with a through hole 210H formed at the diametrical center to extend in the opening/closing direction VL. In the third embodiment, the knob 210 includes an outer portion 212, the leg portions (an engagement member) 213, a locking portion 214, and others. The leg portions 213 extend from the outer portion 212 toward the valve closing side (downward in FIG. 8) in the opening/closing direction VL. The leg portions 213 are arranged at four equally spaced intervals in a circumferential direction of the knob 210. Each leg portion 213 includes a first contact surface 213a to be in contact with an outer surface 221a of the engagement part 221 of the sliding nut 220 and a second contact surface 213b protruding radially inwardly from the first contact surface 213a. The leg portions 213 are elastically deformable in an inward-outward direction to move apart from each other and move back to respective original positions in a radial direction of the knob 210 (see FIG. 8).

Further, the knob 210 is provided with the locking portion 214 engaged in a holding groove 225 of the sliding nut 220 on a radially inner side than the outer portion 212. The knob 210 with the locking portion 214 being engaged in the holding groove 225 of the sliding nut 220 is not disengaged from the sliding nut 220.

The sliding nut 220, as shown in FIGS. 8 and 9, has a cylindrical shape with a through hole 220H formed at the diametrical center to extend in the opening/closing direction VL. Inside the through hole 220H, the sliding nut 220 includes an internal thread portion 222 to be engaged with the external thread 52 of the rod 50. Further, the sliding nut 220 includes the engagement part 221 at one end (an upper side in FIG. 8) in the opening/closing direction VL. As shown in FIG. 9, the engagement part 221 includes an outer surface 221a and a plurality of recesses 221F arranged in a circumferential direction. The recesses 221F are spaced at predetermined pitches to be intermittently in a circumferential direction. Each recess 221F has a bottom surface 221Fa to be in contact with the first contact surface 213a of each of the leg portions 213 of the knob 210.

The knob 210 and the sliding nut 220 are integrally connected in such a manner that the first contact surfaces 213a of the leg portions 213 of the knob 210 are brought into contact with the outer surface 221a of the engagement part 221 of the sliding nut 220, and that the second contact surfaces 213b of the leg portions 213 are brought into contact with the bottom surfaces 221Fa of four of the recesses 221F of the sliding nut 220. The leg portions 213 elastically grasp the engagement part 221 radially inwardly. When the knob 210 is rotated by the torque less than or equal to a predetermined value, accordingly, the knob 210 and the sliding nut 220 are rotated together, thereby transmitting the rotation of the knob 210 to the sliding nut 220.

In addition, the knob 210 is rotated to move the rod 50 in the opening/closing direction VL relative to the sliding nut 220 by screw feeding through the engagement between the internal thread portion 222 of the sliding nut 220 and the external thread 52 of the rod 50. Since such operation is the same as in the first and second embodiments, the explanation for this technique is omitted.

Further, similar to the sliding nuts 20 and 120 in the first and second embodiments, an external thread 223 and a flange 224 are provided on the periphery of the sliding nut 220. Since such a manner that the body 80 holds the flange 224 of the sliding nut 220 is the same as in the first and second embodiments, an explanation for this technique is omitted.

In the manual valve 200, when the knob 210 is rotated with the larger torque than the predetermined value, the leg portions 213 are elastically deformed in the inward-outward direction. Therefore, even if an operator keeps rotating the knob 210 after the valve element 63 is brought into contact with the valve seat 93 as shown in FIG. 1, the leg portions 213 are elastically deformed radially outwardly (in directions indicated with arrows in FIG. 8). Consequently, the first and second contact surfaces 213a and 213b of the leg portions 213 are separated from the outer surface 221a and the bottom surfaces 221Fa of the engagement part 221 of the sliding nut 220 respectively, thereby releasing the engagement part 221 from the grasped state. In short, the leg portions 213 and the engagement part 221 are disengaged from each other. As a result, the knob 210 is circumferentially rotated free with respect to the engagement part 221 of the sliding nut 220, so that the rotation of the knob 210 is not transmitted to the sliding nut 220.

Further, in the manual valve 200 of the third embodiment, the sliding nut 220 is provided with the engagement periphery 221 formed with the plurality of recesses 221F spaced circumferentially intermittently at the predetermined pitches. The leg portions 213 of the knob 210 are designed to be engaged with the engagement part 221 of the sliding nut 220. Therefore, when the knob 210 is rotated with the larger torque than the predetermined value, the engagement between the engagement periphery 221 of the sliding nut 220 and the leg portions 213 of the knob 210 can be easily released.

In the manual valve 200 of the third embodiment, similar to the second embodiment, the leg portions 213 of the knob 210 are claws integral with the knob 210, extending in the opening/closing direction VL to elastically grasp the engagement part 221 of the sliding nut 220 radially inwardly. Therefore, when the knob 210 is rotated with the larger torque than the predetermined value, transmission of the rotation of the knob 210 to the sliding nut 220 can be easily and automatically disabled.

Moreover, compared to the conventional manual valve in which a valve element is brought into contact with a valve seat by urging force of a spring for valve closing (the manual valve disclosed in JP2005-344918A), the manual valve 200 in the third embodiment can be simplified in structure with less number of components or parts, leading to cost reduction. Moreover, the manual valve 200 employs no spring unlike the conventional manual valve, the manual valve 200 can be made compact.

Fourth Embodiment

Figure 10:
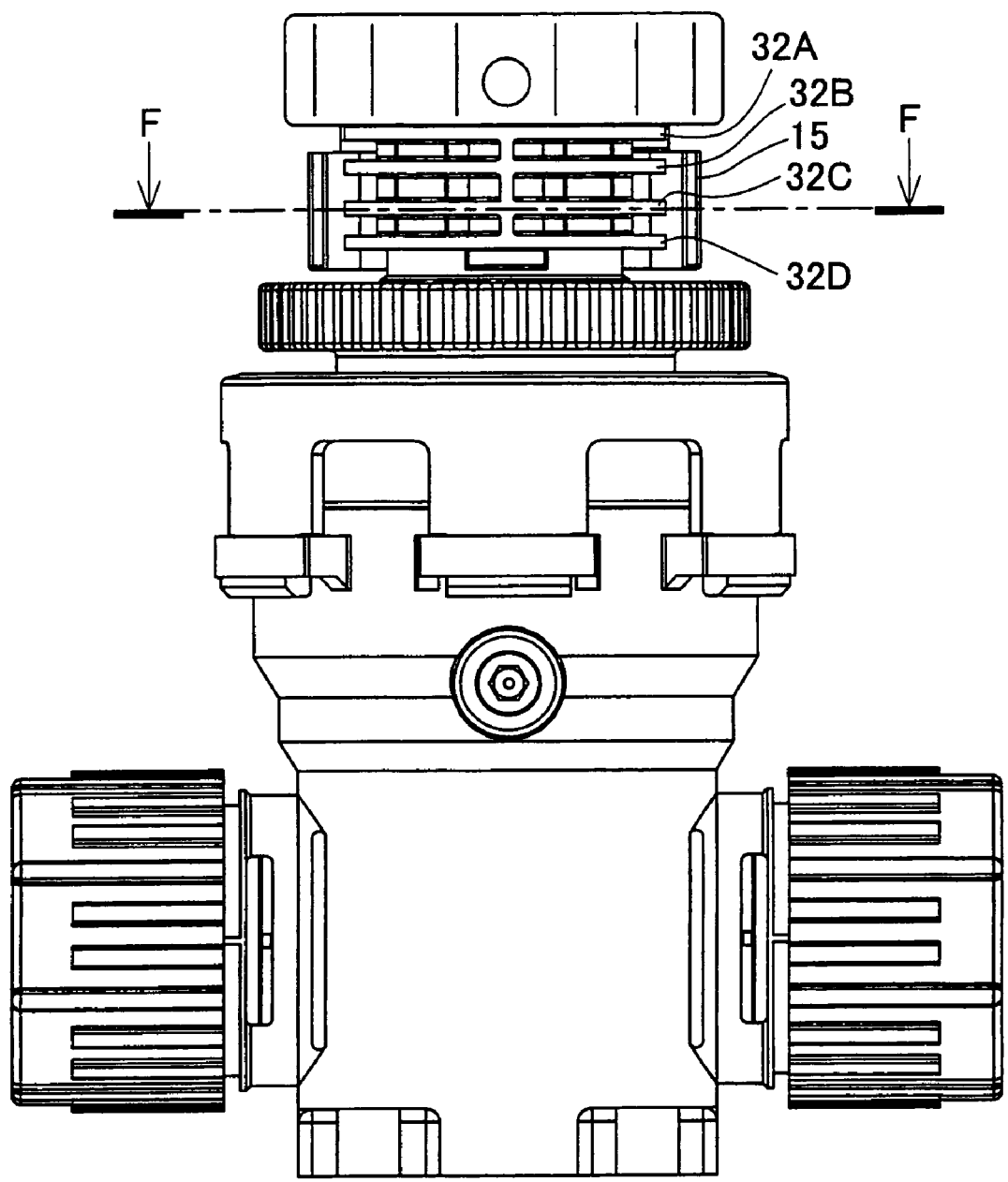
FIG. 10 is a front view of a manual valve in a fourth embodiment.
Figure 11:
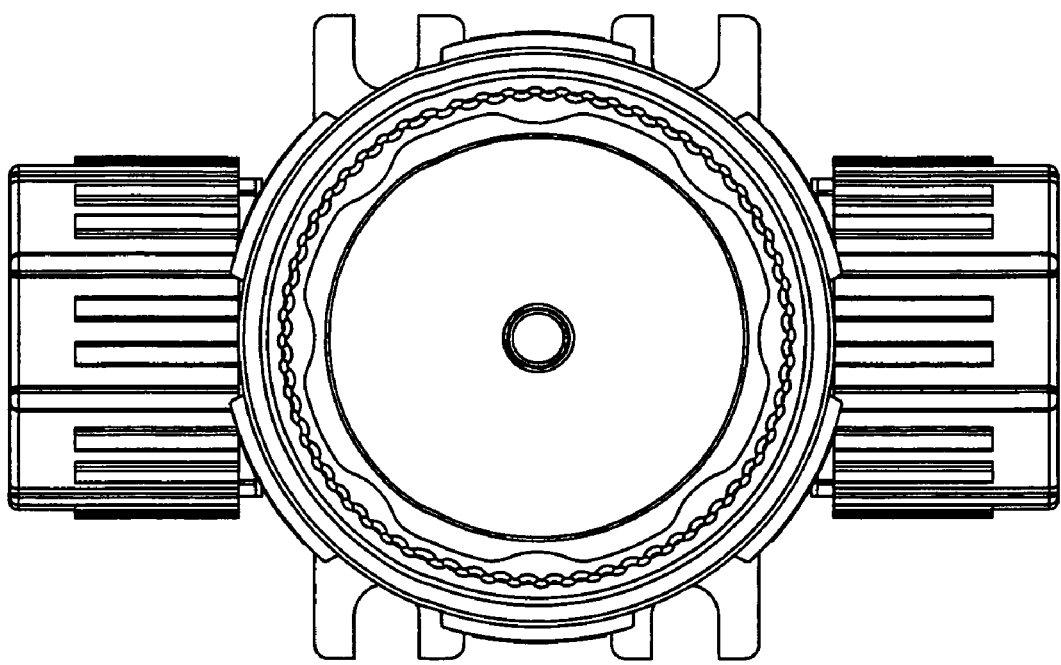
FIG. 11 is a plan view of the manual valve in the fourth embodiment.

Then, a manual valve according to a fourth embodiment is explained referring to FIGS. 10, 11, 12, and 13. FIG. 10 is a front view of the manual valve, FIG. 11 a plan view, FIG. 12 a right side view, and FIG. 13 a sectional view taken along a line F-F in FIG. 10. Since a basic configuration of the manual valve according to the fourth embodiment is similar to that in the first embodiment as shown in FIG. 2, similar components are indicated with the same referential codes with the first embodiment, and explanation thereof is omitted.

Figure 13:
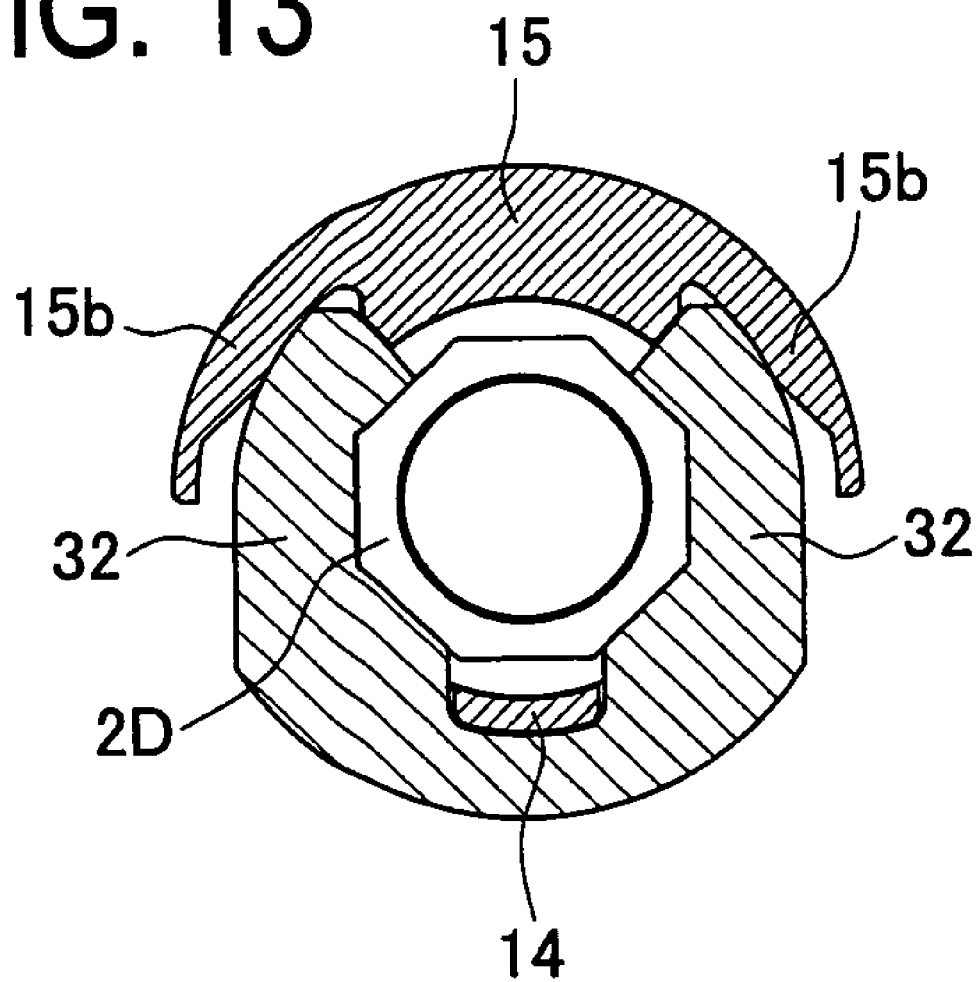
FIG. 13 is a sectional view of the manual valve taken along a line F-F in FIG. 10.

The second locking portion 15 is formed perpendicularly extending downward from a bottom surface of the knob 10. As shown in FIG. 13, the second locking portion 15 has both ends forming pressing portions 15*b* that are elastically deformable radially outwardly. This pair of the pressing portions 15*b* in an outwardly deformed state grasps the holding portion 32, giving a predetermined elastic force to the holding portion 32 in a direction that grasps the sliding nut 20.

Figure 12:
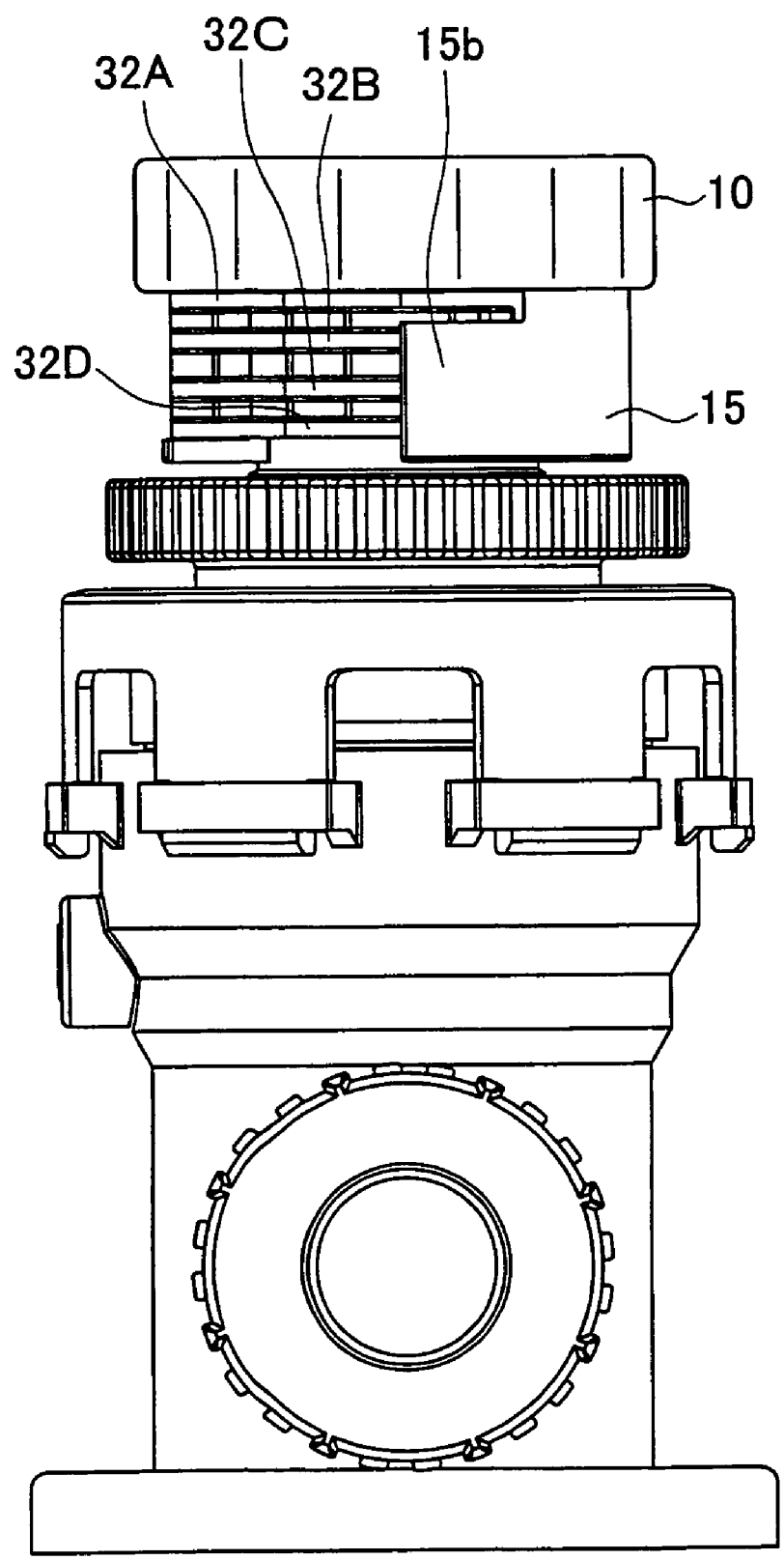
FIG. 12 is a right side view of the manual valve in the fourth embodiment.

As shown in FIGS. 10 and 12, the holding portion 32 includes four divided holding portions 32A, 32B, 32C, and 32D. Each pressing portion 15*b* of the second locking portion 15 has a thickness (height in a vertical direction in FIGS. 10 and 12) so as to vertically cover the holding portions 32B, 32C, and 32D arranged in four layers. The holding portion 32 is divided into four layers so that the holding portion 32 has a wide contact surface 32*a* with respect to the sliding nut 20 while having necessary elastic force (grasping force). With such a configuration including the wide contact surface 32*a*, even when the holding portion 32 is repeatedly separated from and brought into contact with the sliding nut 20, the holding portion 32 can be hardly deformed.

The pressing portions 15*b* hold therein each of the holding portions 32B, 32C, and 32D by a predetermined elastic force, so that necessary torque to disengage the holding portions 32A, 32B, 32C, and 32D from the sliding nut 20 can be increased. Further, even if the holding portions 32A, 32B, 32C, and 32D serving as an engagement member are elastically deformed in different degrees, the elastic force of the pressing portions 15*b* can equalize the elastic deformation degrees. Therefore, a number of finished products (manual valves) can have a uniform predetermined torque value for engagement or disengagement of the pressing portions 15*b* of the second locking portion 15 serving as a restriction member with respect to the sliding nut 220 as a rod feeding member.

Moreover, if the torque is maintained at the predetermined value depending only on the elastic deformation of the engagement member, namely the holding portions 32, the torque could not be kept to the predetermined value when the elastic force is changed by deterioration or the like of the holding portions 32. On the other hand, in the present embodiment, the pressing portions 15*b* of the second locking portion 15 serving as a restriction member impart a predetermined restriction on the elastic deformation of the holding portions 32A, 32B, 32C, and 32D. Even if the holding portions 32A, 32B, 32C, and 32D are deteriorated, the torque can be kept at the predetermined value.

Finally, since the pressing portions 15*b* of the second locking portion 15 are integrally formed with the knob 10, the above-mentioned advantages can be realized without increasing the number of components.

Fifth Embodiment

Figure 14:
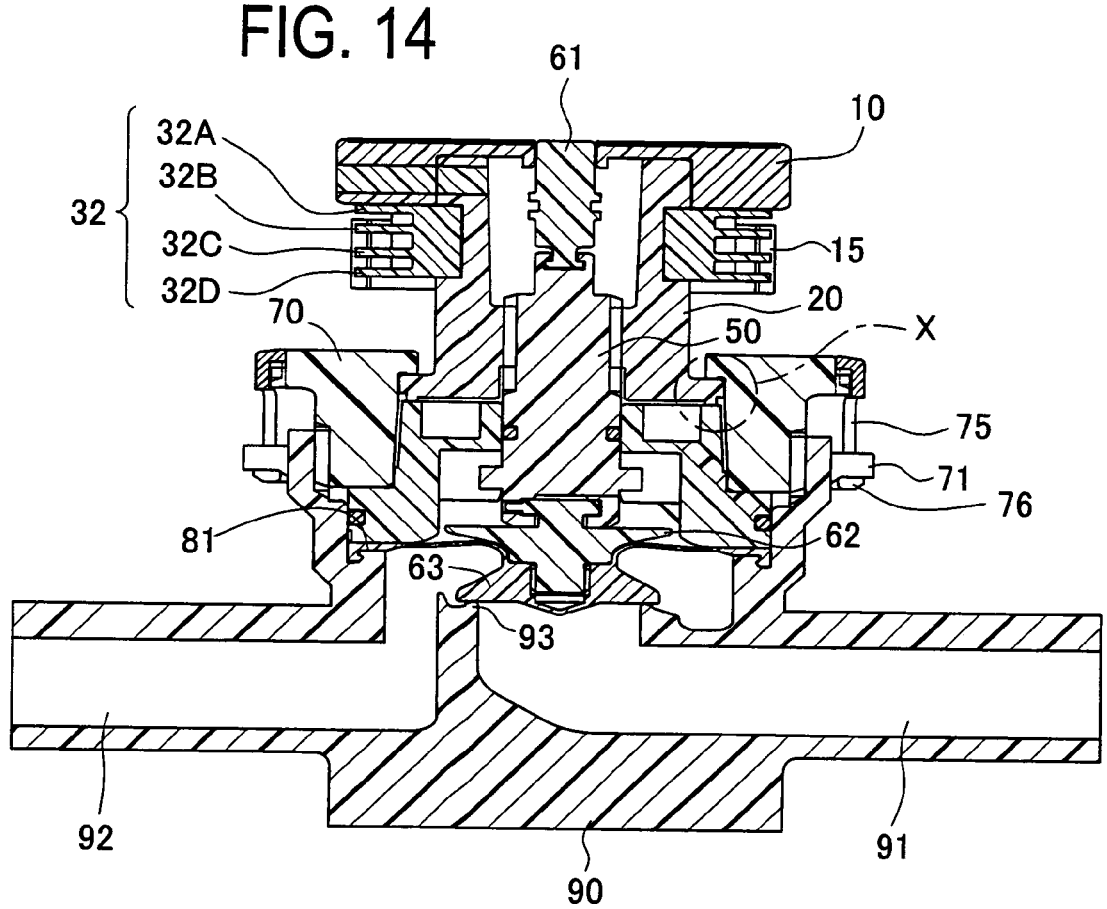
FIG. 14 is a sectional view of a manual valve in a fifth embodiment.

A fifth embodiment of the present invention is explained below. FIG. 14 is a sectional view of a manual valve in the fifth embodiment. The manual valve in the fifth embodiment is similar to the first embodiment shown in FIG. 1 regarding its interior basic structure and similar to the fourth embodiment regarding the holding member 32 and the second locking portion 15. Therefore, similar components are indicated with the same reference codes as in the first and fourth embodiments, and explanation thereof is omitted. The following explanation is made with a focus on the differences from the first and fourth embodiments.

As shown in FIG. 14, on an outer periphery of the valve body 90, a plurality of engagement portions 71 formed with openings are provided. In this embodiment, on an outer periphery of a body 70, a plurality of locking portions 75 each comprising a locking hook 76 at an end portion thereof are formed corresponding to the engagement portion 71.

The body 70 is engaged with the valve body 90 by inserting the locking hooks 76 of the body 70 into the openings of the engagement portions 71 respectively.

Figure 15:
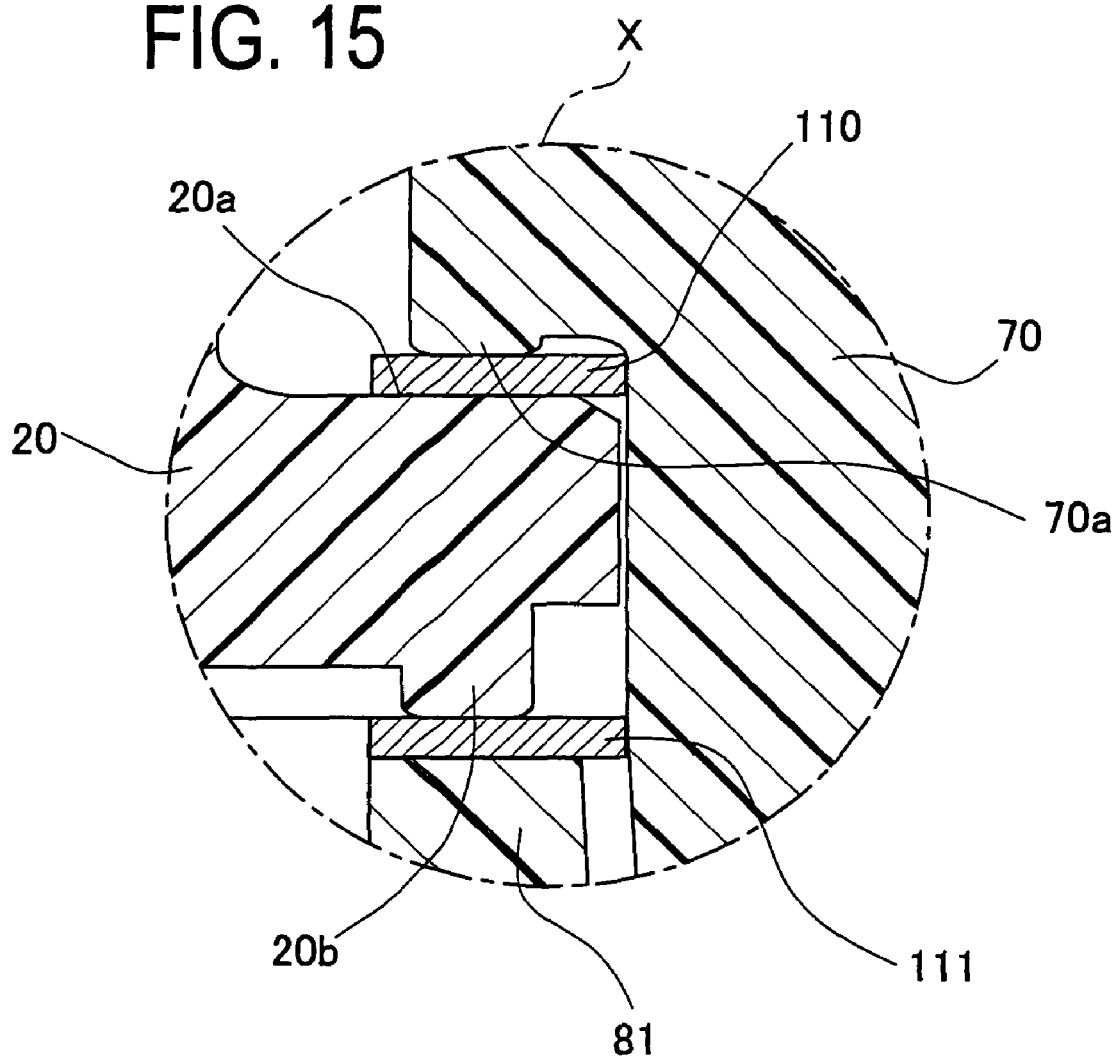
FIG. 15 is an enlarged view of a part X in FIG. 14.
Figure 16:
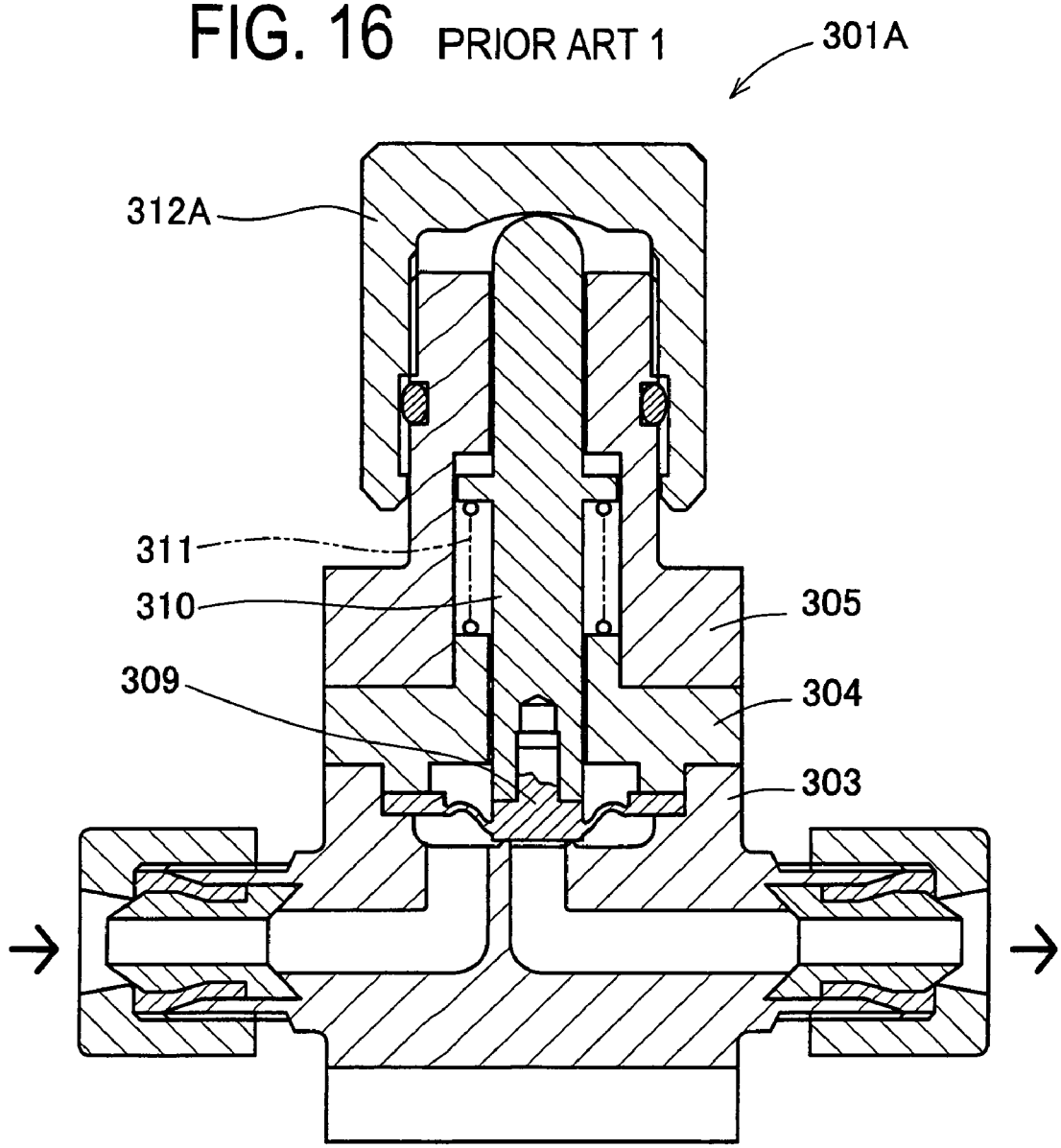
FIG. 16 is an explanatory view of a conventional manual valve.
Figure 17:
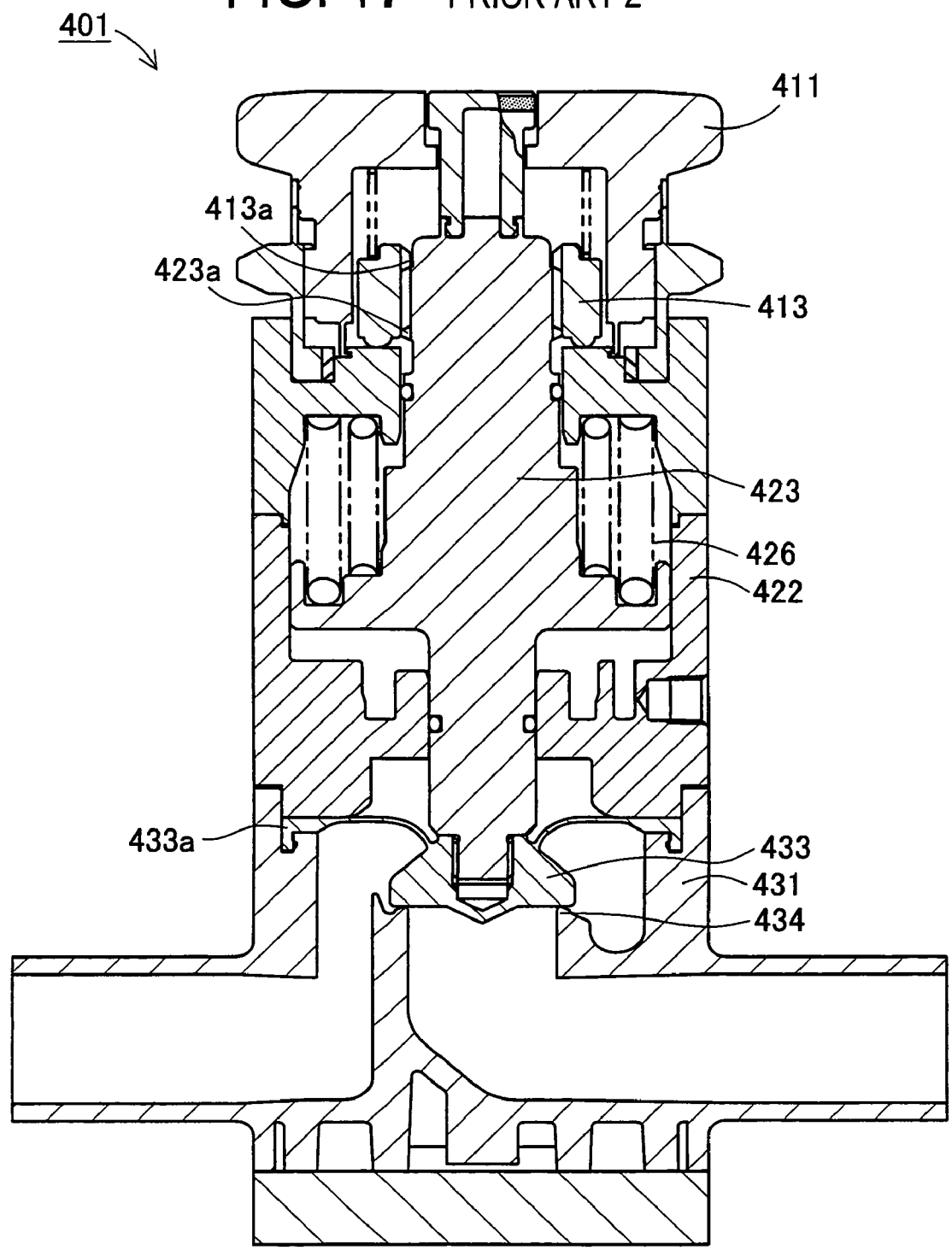
FIG. 17 is an explanatory view of another conventional manual valve.

FIG. 15 is an enlarged view of a part X in FIG. 14. An upper surface 20*a* of the sliding nut 20 and an end surface of a protrusion 70*a* formed in an inner downward surface of the body 70 are brought into contact with each other through a PTFE sheet 110. Further, a bottom surface of a protrusion 20*b* of the sliding nut 20 and an upper surface of the rod holding member 81 are brought into contact with each other through a PTFE sheet 111.

Next, operations and advantages of the fifth embodiment are explained.

In the case where the sliding nut 20 serving as a rod feeding member, the body 70, and the rod holding member 81 are all made of same material (for example, PVDF), for example, when the knob 10 is tightened to move rod 50 downward in the valve closing direction with a larger torque than a predetermined value, the engagement portion is disengaged, making the knob 10 turn free. Accordingly, even if the knob 10 is subsequently rotated in the valve opening direction, the knob 10 will turn free and thus the valve may not be opened properly. On the contrary, when the knob 10, i.e. the rod 50 is rotated in the valve opening direction with the larger torque than the predetermined value, the holding portion 32 is disengaged, making the knob 10 turn free. Accordingly, even if the knob 10 is subsequently rotated in the valve closing direction, the knob 10 will turn free and thus the valve may not be closed properly.

However, in the fifth embodiment, the PTFE sheet 110 is placed between the sliding nut 20 and the body 70, and the PTFE sheet 111 is placed between the sliding nut 20 and the rod holding member 81. Thereby, the torque to rotate the knob 10 in the valve opening direction can be reduced to about 70% of the torque applied to the knob 10 when turns free. Consequently, even after the knob 10 is tightened to move the rod 50 downward in the valve closing direction with the larger torque than the predetermined value, causing the holding portion 32 to be disengaged and the knob 10 to turn free, the knob 10 can be rotated in the valve opening direction without further turning free, thereby reliably achieving the valve opening. On the contrary, even after the knob 10 is rotated in the valve opening direction with the larger torque than the predetermined value, causing the holding portion 32 to be disengaged and the knob 10 to turn free, the knob 10 can be rotated in the valve closing direction without further turning free, thereby reliably achieving valve closing.

In the fifth embodiment, the PTFE sheets 110 and 111 are employed, but PFA sheets or the like can be employed instead.

In the fifth embodiment, the PTFE sheets 110 and 111 are employed, but instead, at least one of the contact surfaces of the sliding nut 20 and the body 70 may be provided with fluorine coating, and at least one of the contact surfaces of the sliding nut 20 and the rod holding member 81 may also be provided with fluorine coating. This makes it possible to reduce the torque to rotate the knob 10 in the valve opening direction to about 70% of the torque applied to the knob 10 when turns free. Therefore, even after the knob 10 is tightened to move the rod 50 downward in the valve closing direction with the larger torque than the predetermined value, causing the holding portion 32 to be disengaged and the knob 10 to turn free, the knob 10 can be rotated in the valve opening direction without further turning free, thereby reliably achieving the valve opening. On the contrary, even after the knob 10 is rotated in the valve opening direction with the larger torque than the predetermined value, causing the holding portion 32 to be disengaged and the knob 10 to turn free, the knob 10 can be rotated in the valve closing direction without further turning free, thereby reliably achieving valve closing.

Besides the fluorine coating, other coatings can be employed as long as coating material has small coefficient of friction.

Further, in the fifth embodiment, the PTFE sheets 110 and 111 are employed, but instead, the sliding nut 20 may be made of PFA and the body 70 and the rod holding member 81 may be made of PVDF. This makes it possible to reduce the torque to rotate the knob 10 in the valve opening direction to about 70% of the torque applied to the knob 10 when turns free. Therefore, even after the knob 10 tightened to move the rod 50 downward in the valve closing direction with the larger torque than the predetermined value, causing the holding portion 32 to be disengaged and the knob 10 to turn free, the knob 10 can be rotated in the valve opening direction without further turning free, thereby reliably achieving the valve opening. On the contrary, even after knob 10 is rotated to the valve opening direction with the larger torque than the predetermined value, causing the holding portion 32 to be disengaged and the knob 10 to turn free, the knob 10 can be rotated in the valve closing direction without further turning free, thereby reliably achieving valve closing.

As long as the material for the sliding nut 20 is different from the materials of the body 70 and the rod holding member 81, other combinations of materials may be adopted.

While the presently preferred embodiments of the present invention have been shown and described, the present invention may be embodied in other specific forms without departing from the essential characteristics thereof.

(1) In the first and second embodiments, the engagement part 21, 121 of the sliding nut 20, 120 has eight outer surfaces 21a continuous in an octagonal shape. However, the engagement member of the rod feeding member may be any polygonal shape having plural continuous surfaces.

(2) For example, in the third embodiment, the engagement periphery 221 of the sliding nut 20 is, as shown in FIG. 9, formed with the plurality of recesses 221F which are circumferentially and intermittently spaced at the predetermined pitches. As an alternative, the engagement part of the engagement member of the rod feeding member may be formed with a plurality of protrusions which are circumferentially and intermittently arranged at predetermined pitches.

(3) For example, in the first to third embodiments, components such as the knobs 10, 100, 200 and the clip 30 are made of fluorine resin. However, the materials for the knob and the engagement member are not limited to resin and may be any one, such as metal, that is elastically deformable when the knob is rotated with the larger torque larger than the predetermined value.

(4) For example, in the first embodiment, the marks of the indicator 61 are provided by color coding by use of color tapes, color coatings or the like. However, the indicator 61 may be provided with other forms such as recesses or scales that indicate more accurate valve opening degrees. Any forms may be employed as long as an operator can identify the valve opening degree.

What is claimed is:

1. A manual valve comprising;
an inlet port;
an outlet port;
a valve seat formed in a passage for fluid, communicating the inlet port to the outlet port,
a valve element that is movable into or out of contact with the valve seat to control a flow of the fluid;
a rod connected to the valve element; and
a knob for moving the rod by screw feeding in an opening/closing direction of the valve element,
the manual valve being arranged to move the valve element through the rod by rotation of the knob,
wherein
the rod is formed with an external thread portion on an outer periphery thereof, the rod being unconnected to the knob but being held against rotation,
the manual valve further comprises a rod feeding member of a cylindrical shape, the rod feeding member being rotatably held and internally formed with an internal thread portion to be threadedly engaged with the external thread portion of the rod, and
an engagement member fixed to the knob, the engagement member being elastically deformable to be engaged with the rod feeding member and disengaged from the rod feeding member when a larger torque than a predetermined value is applied to the engagement member.

2. The manual valve according to claim 1, wherein
the rod feeding member comprises an engagement part including a plurality of one of recesses circumferentially intermittently arranged at predetermined pitches, protrusions circumferentially intermittently arranged at predetermined pitches, and circumferentially continuous faces, and
the engagement member is engaged with the engagement part.

3. The manual valve according to claim 2, wherein
the engagement member is a separate member from the knob and is engaged with the knob to elastically hold a part of the engagement part of the rod feeding member.

4. The manual valve according to claim 2, wherein
the engagement member includes a plurality of claws integral with the knob, extending in the opening/closing direction and elastically holding a part of the engagement part of the rod feeding member radially inwardly.

5. The manual valve according to claim 3, wherein
at least one of the engagement member and the rod feeding member is made of resin.

6. The manual valve according to claim 1, wherein
the knob is formed with a through hole on a center,
the rod comprises an indicator at an end to identify a position of the rod and is inserted in the rod feeding member, and
the indicator is movable inside and outside the through hole of the knob in accordance with movement of the rod.

7. The manual valve according to claim 1, comprising a restriction member for restricting elastic deformation of the engagement member so as to disengage the rod feeding member.

8. The manual valve according to claim 7, the restriction member is integrally formed with the knob.

9. The manual valve according to claim 7, wherein
the predetermined value of the torque is determined by elastic deformation force of the restriction member.

10. The manual valve according to claim 9, wherein
the engagement member comprises a plurality of divided layers.

11. The manual valve according to claim 8, wherein
a predetermined value of the torque is determined by elastic deformation force of the restriction member.

12. The manual valve according to claim 11, wherein the engagement member comprises a plurality of divided layers.

13. The manual valve according to claim 1, wherein the engagement member comprises a plurality of divided layers.

14. The manual valve according to claim 1, further comprising
a holding member for the rod feeding member and
a sliding sheet held between the rod feeding member and the holding member.

15. The manual valve according to claim 14, wherein the sliding sheet is made of PTFE.

16. The manual valve according to claim 1, wherein at least one of contact surfaces of the rod feeding member and the holding member is applied with surface treatment.

17. The manual valve according to claim 16, wherein the surface treatment is fluorine coating.

18. The manual valve according to claim 1, wherein the rod feeding member and the holding member are made of different materials with different frictional coefficients.

19. The manual valve according to claim 18, wherein the rod feeding member is made of PFA and the holding member is made of PVDF.

* * * * *